(12) United States Patent  
Prasad

(10) Patent No.: US 9,942,939 B2  
(45) Date of Patent: Apr. 10, 2018

(54) CODING SCHEME SELECTION FOR 5G AIR INTERFACE

(71) Applicant: Verizon Patent and Licensing Inc., Arlington, VA (US)

(72) Inventor: Abhinav Prasad, Edison, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 74 days.

(21) Appl. No.: 15/095,720

(22) Filed: Apr. 11, 2016

(65) Prior Publication Data

US 2017/0295607 A1  Oct. 12, 2017

(51) Int. Cl.
*H04W 4/00* (2009.01)
*H04W 76/04* (2009.01)
*H04B 17/336* (2015.01)

(52) U.S. Cl.
CPC ........ *H04W 76/046* (2013.01); *H04B 17/336* (2015.01); *H04B 2201/709709* (2013.01)

(58) Field of Classification Search
CPC ............... H04W 76/046; H04B 17/336; H04B 2201/709704

See application file for complete search history.

(56) References Cited

U.S. PATENT DOCUMENTS

2008/0168332 A1* 7/2008 Palanki ................. H04L 1/0007  
714/776  
2014/0337682 A1* 11/2014 Prodan ................. H03M 13/116  
714/755  
2015/0373600 A1* 12/2015 Malkamaki ........... H04W 48/20  
370/331

* cited by examiner

*Primary Examiner* — Robert Wilson

(57) ABSTRACT

A method, a device, and a non-transitory storage medium that stores instructions to store one or multiple instances of first data that indicate one or multiple types of forward error correction (FEC) coding schemes supported by an end device; generate a radio resource control connection request; select one of the one or multiple instances of first data during the generation of the radio resource control connection request; include the one of the one or multiple instances of first data in the radio resource control connection request in response to the selection; and transmit the radio resource control connection request to a wireless station of a wireless network in response to the inclusion.

20 Claims, 22 Drawing Sheets

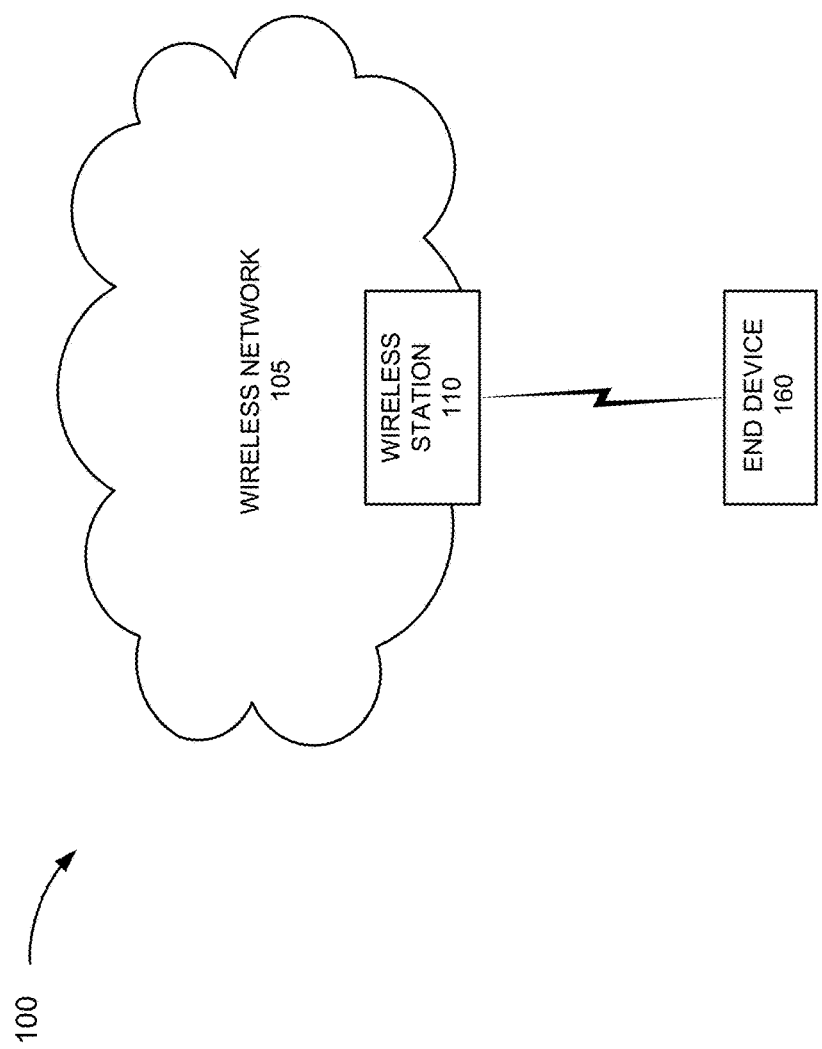

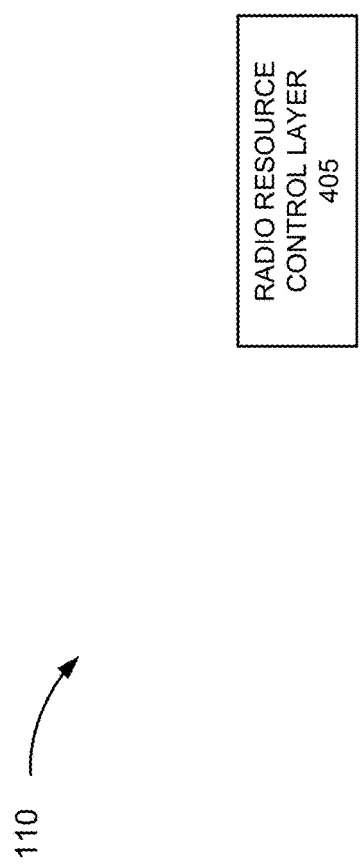

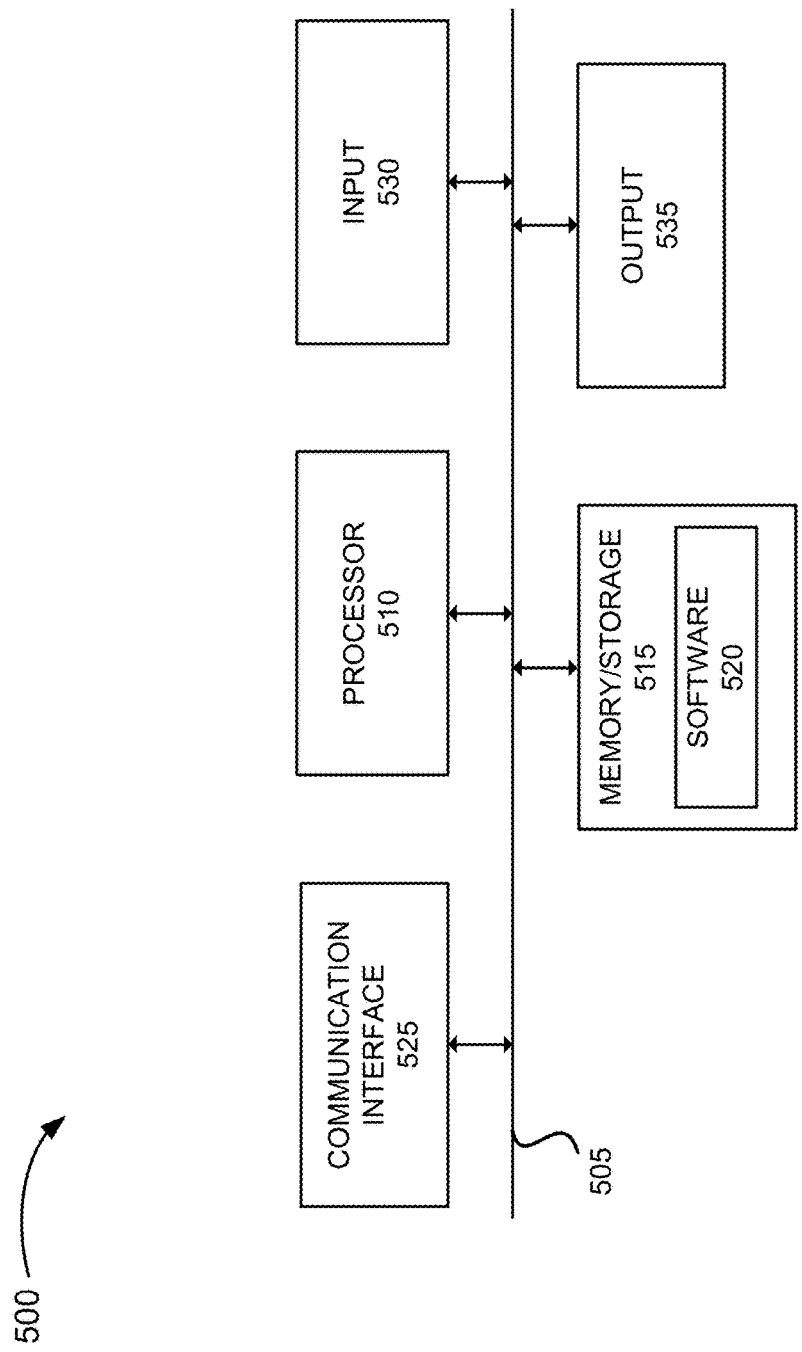

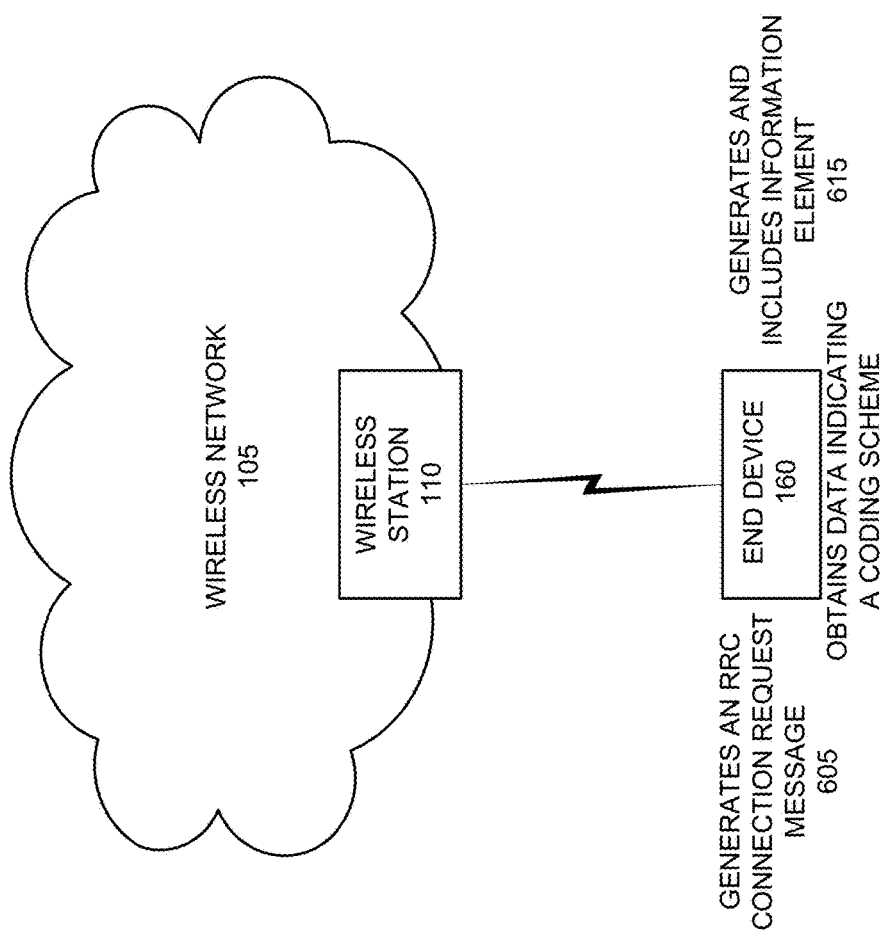

| TABLE 1000 | | | | | |
|---|---|---|---|---|---|
| | INDEX | CODING TYPE | CODE RATE | CHANNEL CONDITION | MODULATION TYPE |
| 1030-1 → | 1 | TURBO | 0 | <0 | 4-QAM |
| | ••• | ••• | ••• | ••• | ••• |
| 1030-Z → | 25 | LDPC | 0.6 | 15 | 64-QAM |
| | ↑ 1005 | ↑ 1010 | ↑ 1015 | ↑ 1020 | ↑ 1025 |

Fig. 10

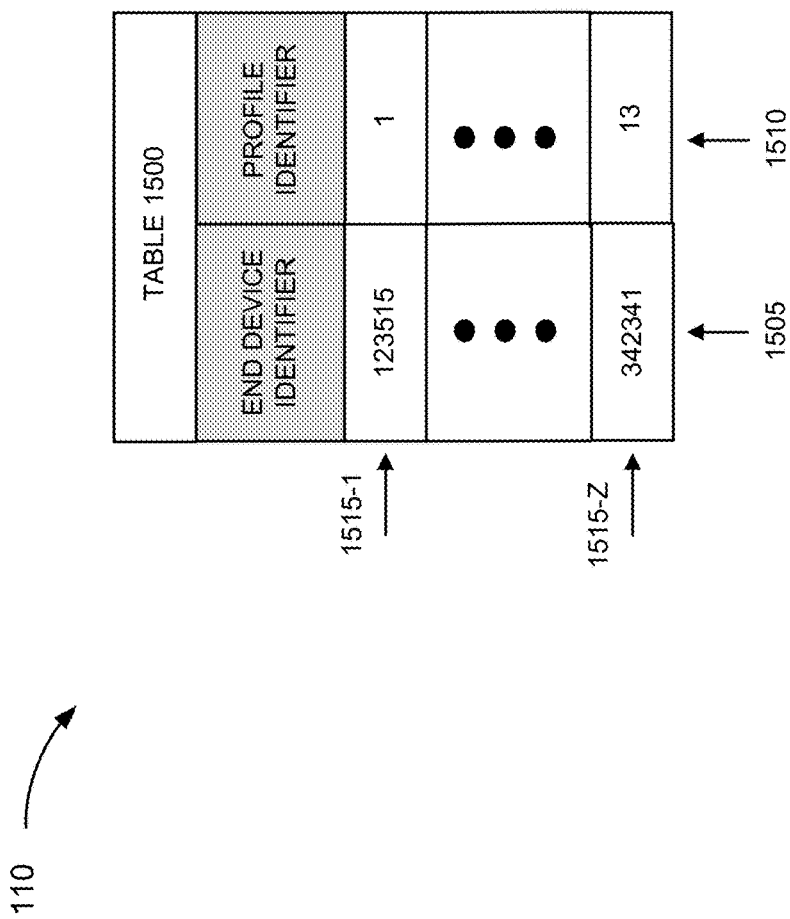

CODING SCHEME SELECTION FOR 5G AIR INTERFACE

BACKGROUND

In a wireless environment, different data coding schemes may have different benefits and disadvantages. For example, a forward error correction (FEC) coding scheme may be used to control errors that may occur during transmission.

BRIEF DESCRIPTION OF THE DRAWINGS

FIG. 1 is a diagram illustrating an exemplary environment in which an exemplary embodiment of a coding selection service may be implemented;

FIG. 4 is a diagram illustrating exemplary element of an exemplary embodiment of the wireless station depicted in FIG. 1;

FIG. 5 is a diagram illustrating exemplary components of a device that may correspond to one or more of the devices depicted in FIG. 1;

FIGS. 6A-6D are diagrams illustrating an exemplary process of the coding selection service performed in the exemplary environment;

FIG. 10 is a diagram illustrating exemplary coding data used by the end device and the wireless station to provide an adaptive coding selection service;

FIG. 15 is a diagram illustrating exemplary data used by the wireless station to provide the adaptive coding selection service.

DETAILED DESCRIPTION OF PREFERRED EMBODIMENTS

Figure 2A:
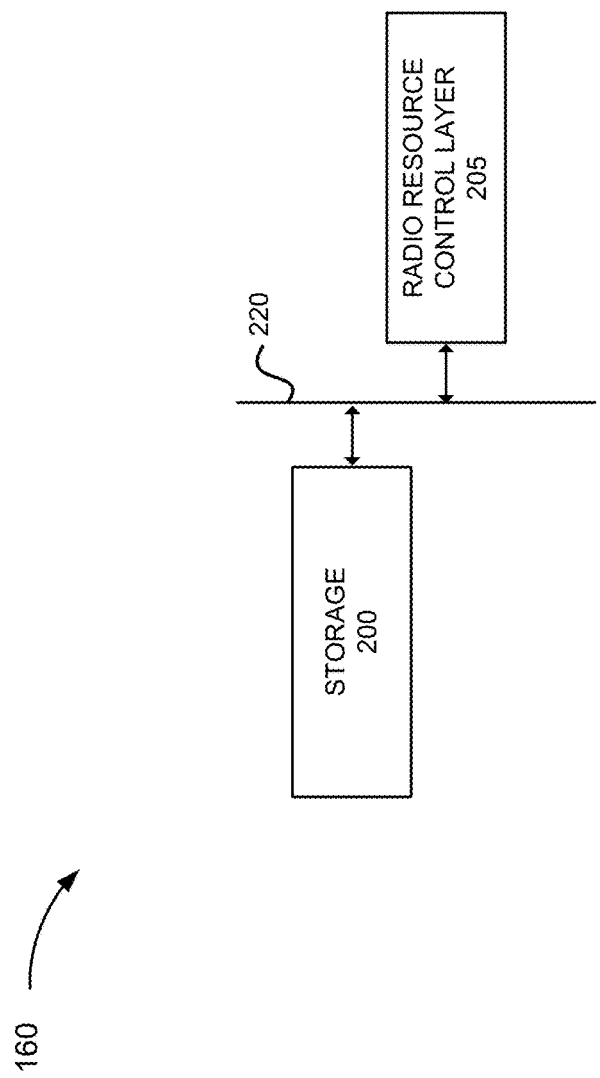
FIG. 2A is a diagram illustrating exemplary elements of an exemplary embodiment of the end device depicted in FIG. 1.

The following detailed description refers to the accompanying drawings. The same reference numbers in different drawings may identify the same or similar elements. Also, the following detailed description does not limit the invention.

A 5G wireless system may include a mixture of end devices that support various types of FEC coding schemes. For example, the FEC coding schemes may include Low Density Parity Check (LDPC) coding, Turbo coding, Sparse Regression coding, Polar coding, or some other type of FEC coding scheme. Consequently, a Fifth Generation (5G) network needs information that indicates the FEC coding to be used by or supported by a particular end device.

According to an exemplary embodiment, a coding selection service is described in which a 5G network determines an FEC coding scheme to be used for signaling or control messages based on data transmitted by the end device. According to an exemplary implementation, the end device provides data, which indicates its FEC coding capability, in a connection request message. In response to receipt of the connection request message, the 5G network uses the data carried in the connection request message to determine whether Turbo coding, LDPC coding, or some other type of coding can be used when signaling or control messages are communicated via a signaling channel or a control channel between the end device and the 5G network.

While exemplary embodiments are described with reference to particular messages, such messages are exemplary. For example, while a Radio Resource Control (RRC) Connection Request message may be used in Fourth Generation (4G), Third Generation (3G), etc., networks, a 5G wireless system (e.g., a 5G wireless network and an end device) may use, while similar in kind, a different type of initial or connection request message to establish a wireless connection between the end device and a wireless station, and such a message may be used to carry data that indicates a type of FEC coding scheme supported by the end device. Thus, the nomenclature of an "RRC Connection Request" message, as described herein, is not intended to be limiting when embodiments are implemented in a 5G wireless system or any other type of wireless system. Similarly, for example, while the RRC Connection Setup message may be used in 4G, 3G, etc., networks, a 5G wireless system may use, while similar in kind, a different type of message to respond to an initial or connection request to establish a wireless connection. Thus, the nomenclature of an "RRC Connection Setup" message, as described herein, is not intended to be limiting when embodiments are implemented in a 5G wireless system or any other type of wireless system. Nevertheless, a 5G wireless system may use an RRC Connection Request message and an RRC Connection Setup message.

Additionally, while exemplary embodiments are described with reference to a particular layer, such a layer is exemplary. For example, while a 4G wireless system may operate using an RRC layer, a 5G may use, while similar in kind, a different type of layer. Thus, the nomenclature of a "radio resource control layer" is not intended to be limiting when embodiments are implemented in a 5G wireless system or some other existing wireless system. Nevertheless, a 5G wireless system may use a radio resource control layer or some other type of layer three or control plane layer that manages layer three signaling between the end device and a network element (e.g., a wireless station) of a wireless network and provides the coding selection service, as described herein.

FIG. 1 is a diagram illustrating an exemplary environment 100 in which an exemplary embodiment of a coding selection service may be implemented. As illustrated, environment 100 includes a wireless network 105. Wireless network 105 includes a wireless station 110. Environment 100 further includes an end device 160.

Environment 100 is implemented to include a wireless connection between wireless station 110 and end device 160. The wireless connection between wireless station 110 and end device 160 may be direct or indirect and may involve an intermediary device not illustrated in FIG. 1. For example, environment 100 may include a femto device, a pico device, a home eNB, or other type of wireless station (e.g., a relay device, etc.). Additionally, or alternatively, the wireless connection may involve an intermediary wireless network not illustrated in FIG. 1. For example, the intermediary wireless network may include a local area network (LAN), a personal area network (PAN), or some other type of wireless network.

According to an exemplary embodiment, wireless network 105 includes a wireless network that operates according to a 5G specification or standard. According to other exemplary embodiments, wireless network 105 includes a wireless network that operates according to a specification or a standard other than a 5G specification or standard. For example, wireless network 105 may operate as a 3G network, a 4G network, an LTE network, an LTE-Advanced (LTE-A) network, a Global System for Mobile Communications (GSM) network, a Code Division Multiple Access (CDMA) network, a Wideband Code Division Multiple Access (WCDMA) network, an Ultra Mobile Broadband (UMB) network, a High-Speed Packet Access (HSPA) network, an Evolution Data Optimized (EV-DO) network, a Universal Mobile Telecommunications System (UMTS) network, or some other type of wireless network (e.g., an ad hoc network, a non-land-based wireless network, etc.). According to an exemplary implementation, wireless network 105 includes a radio access network (RAN) and a core network. According to another exemplary implementation, wireless network includes the RAN.

Wireless station 110 includes a network device that has computational and wireless communicative capabilities. Wireless station 110 may be implemented as a base station (BS), a base transceiver station (BTS), a Node B, an evolved Node B (eNB), a remote radio head (RRH), an RRH and a baseband unit (BBU), a BBU, or other type of wireless node that provides wireless access to wireless network 105. According to an exemplary embodiment, wireless station 110 includes logic that selects and uses an FEC coding scheme, which is indicated in data carried by a connection request message, to communicate with end device 160. For example, the connection request message may be implemented as an RRC Connection Request message.

End device 160 includes a device that has computational and wireless communicative capabilities. End device 160 may be implemented as a mobile device, a portable device, or a stationary device. For example, end device 160 may be implemented as a smartphone, a personal digital assistant, a tablet, a netbook, a phablet, an infotainment system in a vehicle, or a wearable device (e.g., a watch, glasses, etc.). Alternatively, for example, end device 160 may be implemented as a kiosk, a point of sale terminal, a vending machine, a set top box, and so forth. According to yet other examples, end device 160 may be implemented as a machine-type device. For example, end device 160 may be an Internet of Things (IoT) device. According to an exemplary embodiment, end device 160 includes logic that selects and packages data, which indicates a type of FEC coding supported, in a connection request message. For example, the connection request message may be implemented as an RRC Connection Request message.

FIG. 2A is a diagram illustrating exemplary elements of an exemplary embodiment of end device 160. Referring to FIG. 2A, end device 160 includes a storage 200 and a radio resource control layer 205. According to other exemplary embodiments, end device 160 may include additional and/or different elements than those illustrated in FIG. 2A and described herein. Additionally, multiple elements may be combined into a single element and/or a single element may be implemented as multiple elements in which a process or a function may be collaboratively performed or multiple processes or functions may be split between them.

Storage 200 and radio resource control layer 205 may be connected to and communicate with each other via a link 220. Link 220 may be implemented as a hardware link (e.g., a bus, a shared memory space, etc.) or a software link (e.g., inter-process communication (IPC), etc.).

Storage 200 includes a memory or other type of storage medium that stores data that indicates a capability about end device 160. For example, storage 200 stores data that indicates a (single) type of FEC coding scheme supported by end device 160. By way of further example, storage 200 stores data that indicates a single type of FEC coding scheme such as LDPC, Turbo, Polar, or some other type of FEC coding. Additionally, storage 200 may also store data that indicates a coding rate associated with the FEC coding scheme.

Radio resource control layer 205 includes logic that obtains data from storage 200, which indicates the type of FEC coding scheme supported by end device 160, and packages the data in a request for a wireless connection (e.g., a radio connection request). For example, an upper layer of a stack (e.g., relative to radio resource control layer 205) resident on end device 160 may request that radio resource control layer 205 establish an RRC connection. By way of example, with reference to an E-UTRAN protocol stack, a non-access stratum (NAS) layer may be an upper layer of RRC layer 205). The upper layer may also pass other parameters (e.g., a temporary identifier of end device 160, etc.) to radio resource control layer 205. In response, radio resource control layer 205 obtains the data stored in storage 200 and generates an information element or other entity to be included in the RRC Connection Request message. According to an exemplary implementation, the data of the information element is structured according to Abstract Syntax Notation One (ASN.1). For example, the information element indicates the type of FEC coding scheme according to the following syntax or type/value pair {FEC-type:value}. By way of further example, when the type of FEC coding scheme is Turbo, the information element may indicate {FEC type:Turbo}. According to other implementations, the data of the information element may be structured according to another type of language (e.g., Extensible Markup Language (XML) or some other type of schema language).

Radio resource control layer 205 includes logic that packages the information element (e.g., data that indicates the type of FEC coding scheme supported by end device 160) in the RRC Connection Request message. Radio resource control layer 205 may generate and/or include other information elements in the RRC Connection Request message before passing the RRC Connection Request message to a lower layer (e.g., a Medium Access Control (MAC) layer, a Physical layer, a layer 2, or the like).

Figure 2B:
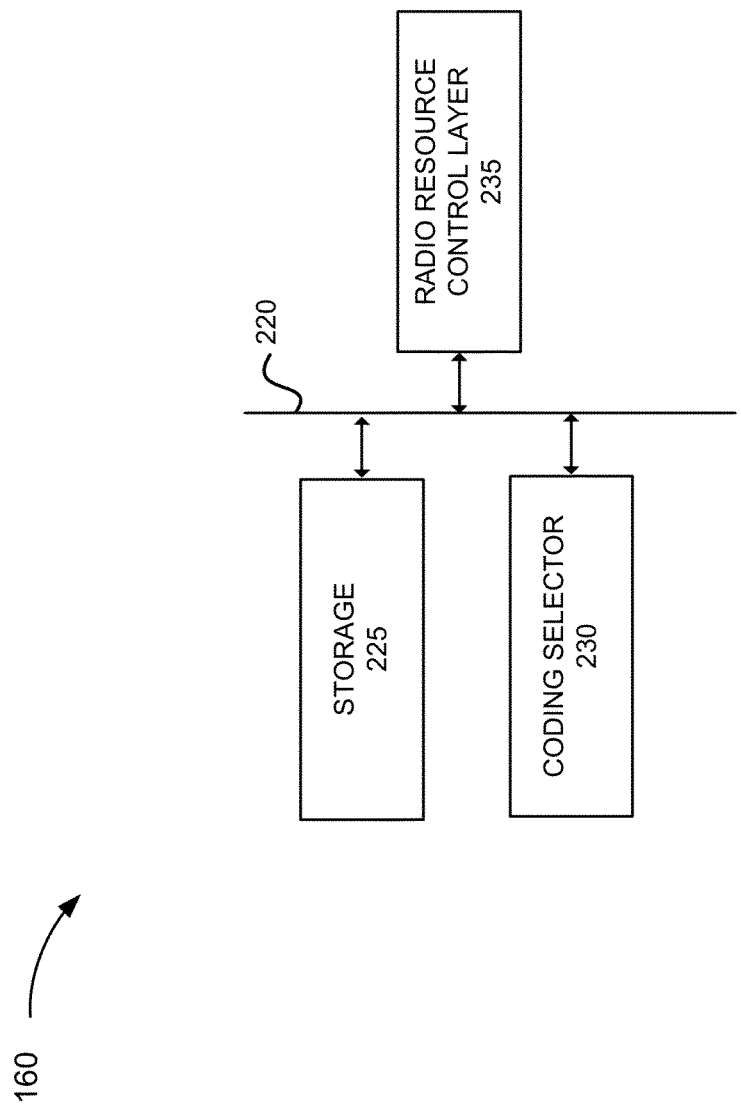
FIG. 2B is a diagram illustrating exemplary elements of another exemplary embodiment of the end device depicted in FIG. 1.

FIG. 2B is a diagram illustrating exemplary elements of another exemplary embodiment of end device 160. Referring to FIG. 2B, end device 160 includes a storage 225, a coding selector 230, and a radio resource control layer 235. According to other exemplary embodiments, end device 160 may include additional and/or different elements than those illustrated in FIG. 2B and described herein. Additionally, multiple elements may be combined into a single element and/or a single element may be implemented as multiple elements in which a process or a function may be collaboratively performed or multiple processes or functions may be split between them. Storage 225, coding selector 230, and radio resource control layer 235 may be connected to and communicate with each other via link 220.

Storage 225 includes a memory or other type of storage medium that stores capability information about end device 160. For example, storage 225 stores data indicating multiple types of FEC coding schemes supported by end device 160. According to an exemplary implementation, storage 225 stores a table or other data structure that correlates a type of FEC coding to a channel condition, examples of which are described below.

Figure 3:
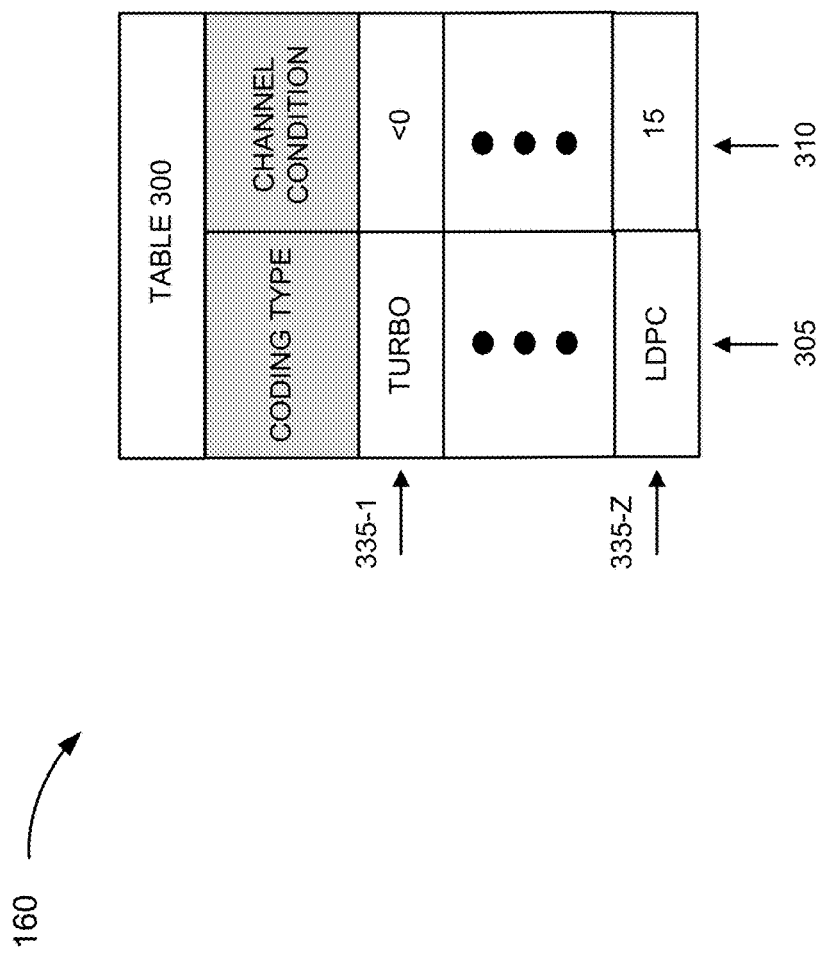
FIG. 3 is a diagram illustrating exemplary coding data used by the end device to provide the coding selection service.

FIG. 3 is a diagram illustrating exemplary coding data that may be stored in an exemplary table 300. For example, end device 160 stores table 300 in storage 225. According to an exemplary implementation, table 300 includes a coding type field 305 and a channel condition field 310. As further illustrated, table 300 includes profiles 335-1 through 335-Z (also referred to as profiles 335 and, individually and generically as profile 335). Each profile 335 includes a grouping of data fields 305 and 310. Each profile 335 includes at least one instance of coding data that is different from another profile 335.

Coding type field 305 stores data that indicates a type of FEC coding. For example, coding type field 305 may store data that indicates Turbo coding, LDPC coding, Polar coding, or some other type of coding. Channel condition field 310 stores data that indicates a channel condition of a control channel or a signaling channel. According to an exemplary implementation, the channel condition is signal-to-noise ratio (SNR). According to such an implementation, channel condition field 310 stores an SNR value. The SNR value may be a single value (e.g., 40 db) or a range of values (40-42.1 db). According to other exemplary implementations, channel condition field 310 stores one or multiple types of channel conditions, as described herein.

According to other implementations, table 300 may store additional instances of coding data and/or different types of coding data. For example, according to other implementations, channel condition field 310 may store one or multiple channel condition values including or excluding an SNR value, such as a signal-to-interference-plus-noise ratio (SINR) value, a received signal strength indicator (RSSI) value, a reference signal received power (RSRP) value, a reference signal received quality (RSRQ) value, or the like. Additionally, or alternatively, coding type field 305 may also store data indicating a coding rate associated with the type of FEC coding.

Referring back to FIG. 2B, coding selector 230 includes logic that selects coding data based on a channel measurement of a control channel or a signaling channel. The channel measurement may be performed by another element (not illustrated in FIG. 2B) of end device 160. For example, end device 160 may measure a reference signal and store a channel condition value in a memory or other storage medium that is accessible to coding selector 230. For example, the channel condition value may be stored in storage 225 or some other memory/storage space. According to an exemplary implementation, the channel measurement pertains to SNR. According to other exemplary implementations, the channel measurement may pertain to a different channel condition.

Coding selector 230 includes logic that obtains and compares the measured channel condition value to the coding data stored in channel condition field 310 of table 300. For example, in response to receiving a request to establish an RRC connection from an upper layer, radio resource control layer 235 may transmit a request to coding selector 230, via an inter-process communication (IPC), to select a type of FEC coding scheme. In response to the request, coding selector 230 identifies the measured channel condition value and compares the measured channel condition value to the coding data stored in channel condition field 310. Based on the result of the comparison, coding selector 210 selects the channel condition value (e.g., the SNR value) that matches or best matches the measured channel condition value (e.g., the measured SNR value) and, in turn selects the type of FEC coding scheme stored in coding type field 305 of the selected profile 335. In response to the selection, coding selector 230 may transmit a response to radio resource control layer 235 via an IPC. The response may include the data that indicates the type of FEC coding scheme, an index value of profile 335 that includes the selected coding data, or a memory address of the coding data.

Radio resource control layer 235 includes logic that obtains data, which indicates the type of FEC coding scheme supported by end device 160, and packages the data in a request for a wireless connection (e.g., a radio connection request). For example, an upper layer of a stack (e.g., relative to radio resource control layer 235) resident on end device 160 may request that radio resource control layer 235 establish an RRC connection. The upper layer may also pass other parameters (e.g., a temporary identifier of end device 160, etc.) to radio resource control layer 235. In response, radio resource control layer 235 obtains the data. According to an exemplary implementation, radio resource layer 205 obtains the data from coding selector 230. According to another exemplary implementation, radio resource control layer 235 obtains the data directly from storage 225 based on information received from coding selector 230. In a manner similar to that previously discussed, radio resource control layer 235 generates an information element or other entity and includes the information element (e.g., data that indicates a type of FEC coding supported by end device 160) in the RRC Connection Request message. According to an exemplary implementation, the data of the information element is structured according to ASN.1 or some other type of language (e.g., XML or the like). For example, the information element may indicate the type of FEC coding scheme according to the following syntax {FEC-type: value}.

FIG. 4 is a diagram illustrating an exemplary element of an exemplary embodiment of wireless station 110. Referring to FIG. 4, wireless station 110 includes a radio resource control layer 405. According to other exemplary embodiments, wireless station 110 may include an additional and/or different element than that illustrated in FIG. 4 and described herein.

Referring to FIG. 4, radio resource control layer 405 includes logic that interprets and uses the information element that indicates the type of FEC coding scheme supported by end device 160, which is included in an RRC Connection Request message, to select the type of FEC coding scheme for communication with end device 160 via a control channel or a signaling channel. For example, in response to receiving the RRC Connection Request message from a lower layer (e.g., a MAC layer, a layer 2, or the like), radio resource control layer 405 interprets the information element. Based on the interpretation of the information element, radio resource control layer 405 generates, based on the FEC coding scheme, an RRC Connection Setup message, and transmits the RRC Connection Setup message to end device 160.

FIG. 5 is a diagram illustrating exemplary components of a device 500 that may correspond to one or more of the devices depicted in environment 100. For example, device 500 may correspond to wireless station 110 and end device 160. Additionally, exemplary elements of end device described in relation to FIG. 2B and elsewhere, as well as exemplary elements of wireless station 110 described in relation to FIG. 4 and elsewhere, may be implemented based on the components described herein. As illustrated in FIG. 5, device 500 includes a bus 505, a processor 510, memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, etc.

Memory/storage 515 includes one or multiple memories and/or one or multiple other types of storage mediums. For example, memory/storage 515 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 515 may include a hard disk (e.g., a magnetic disk, an optical disk, a magneto-optic disk, a solid state disk, etc.) and a corresponding drive. Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 515 may include drives for reading from and writing to the storage medium. As an example, storage 200 and storage 225 may be implemented as memory/storage 515.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software 520, and/or instructions related to the operation of device 500.

Software 520 includes an application or a program that provides a function and/or a process. Software 520 may also include firmware, middleware, microcode, hardware description language (HDL), and/or other form of instruction. As an example, with reference to end device 160, software 520 may include an application that, when executed by processor 510, provides the functions of the coding selection service and the adaptive coding selection service, as described herein. Additionally, with reference to wireless station 110, software 520 may include an application that, when executed by processor 520, provides the functions of the coding selection service and the adaptive coding selection service, as described herein.

Communication interface 525 permits device 500 to communicate with other devices, networks, systems, and/or the like. Communication interface 525 includes one or multiple wireless interfaces. For example, communication interface 525 may include one or multiple transmitters and receivers, or transceivers. Communication interface 525 may operate according to a stack (e.g., a protocol stack, a RAN stack, etc.) and a communication standard. Communication interface 525 may include an antenna. Communication interface 525 may include various processing logic or circuitry (e.g., multiplexing/de-multiplexing, filtering, amplifying, converting, error correction, etc.).

Input 530 permits an input into device 500. For example, input 530 may include a keyboard, a mouse, a display, a button, a switch, an input port, speech recognition logic, a microphone, a camera, and/or some other type of visual, auditory, tactile, etc., input component. Output 530 permits an output from device 500. For example, output 535 may include a speaker, a display, a light, an output port, and/or some other type of visual, auditory, tactile, etc., output component. According to some embodiments, input 530 and/or output 535 may be a device that is attachable to and removable from device 500.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a process described herein. Alternatively, for example, according to other implementations, device 500 performs a process described herein based on the execution of hardware (processor 510, etc.).

Figure 6B:
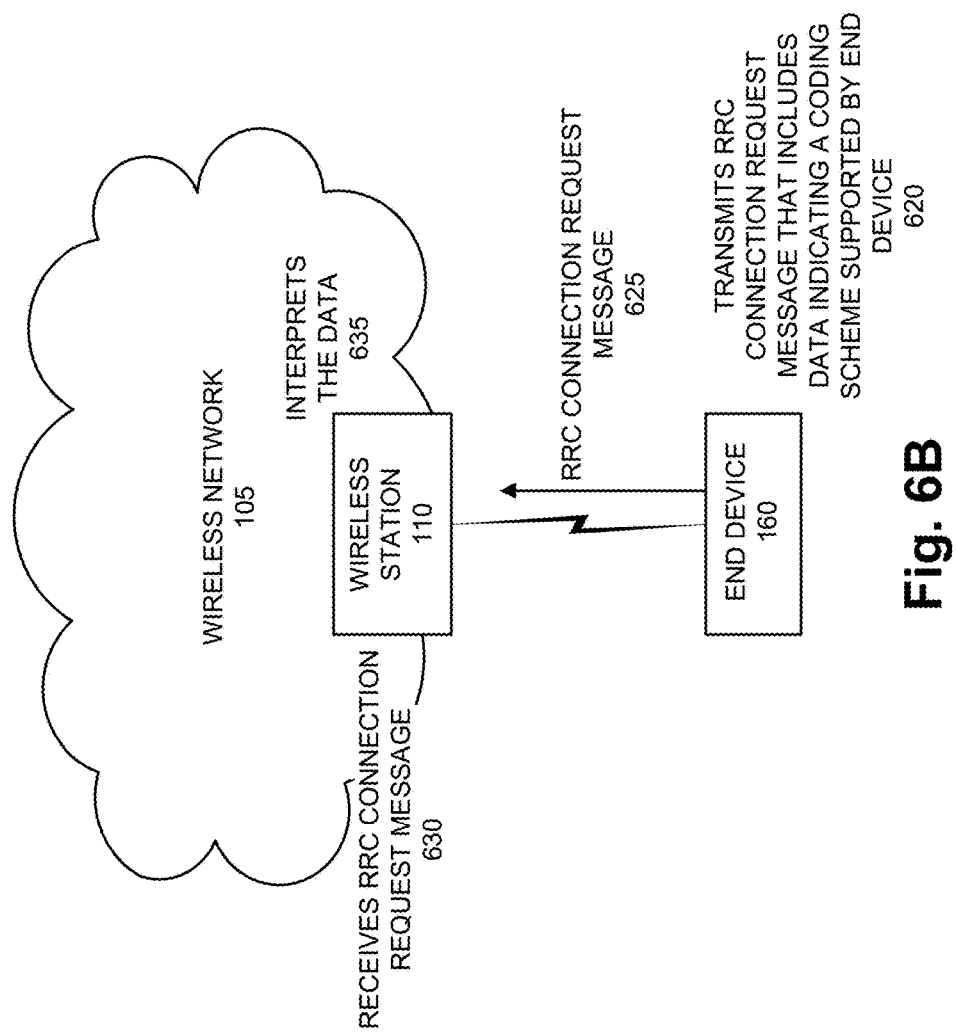

FIGS. 6A-6D are diagrams illustrating an exemplary process of the coding selection service. Referring to FIG. 6A, assume subsequent to a power-up procedure of end device 160, end device 160 generates an RRC Connection Request message. For example, an upper layer of a stack may request that radio resource control layer 205 or 235 establish an RRC connection with wireless station 110. In response, radio resource control layer 205 or 235 of end device 160 generates RRC Connection Request message 605. During the generation process, end device 160 obtains data indicating an FEC coding scheme 610. For example, radio resource control layer 205 may obtain the data from storage 200. Alternatively, radio resource control layer 235 obtains the data based on operations performed by coding selector 230, as previously described. In response to the obtainment of the data, radio resource control layer 205 or 235 generates an information element 615 that includes data indicating the type of FEC coding, and includes the information element in the RRC Connection Request message.

Referring to FIG. 6B, end device 160 transmits the RRC Connection Request message that includes the data 620. For example, end device 160 transmits the RRC Connection Request message via a control channel. According to an exemplary implementation, the RRC Connection Request message is not FEC encoded based on the FEC coding scheme. Rather, the RRC Connection Request message carries data that indicates the FEC coding scheme supported by end device 160. According to another exemplary implementation, the RRC Connection Request message carries the data, which indicates the FEC coding scheme supported, and also is FEC encoded according to the selected FEC coding scheme. Wireless station 110 receives the RRC Connection Request message 630 via the control channel. In response to receiving the RRC Connection Request message, wireless station 110 interprets the data 635. For example, radio resource control layer 405 interprets the data, which indicates the type of FEC coding scheme supported by end device 160.

Figure 6C:
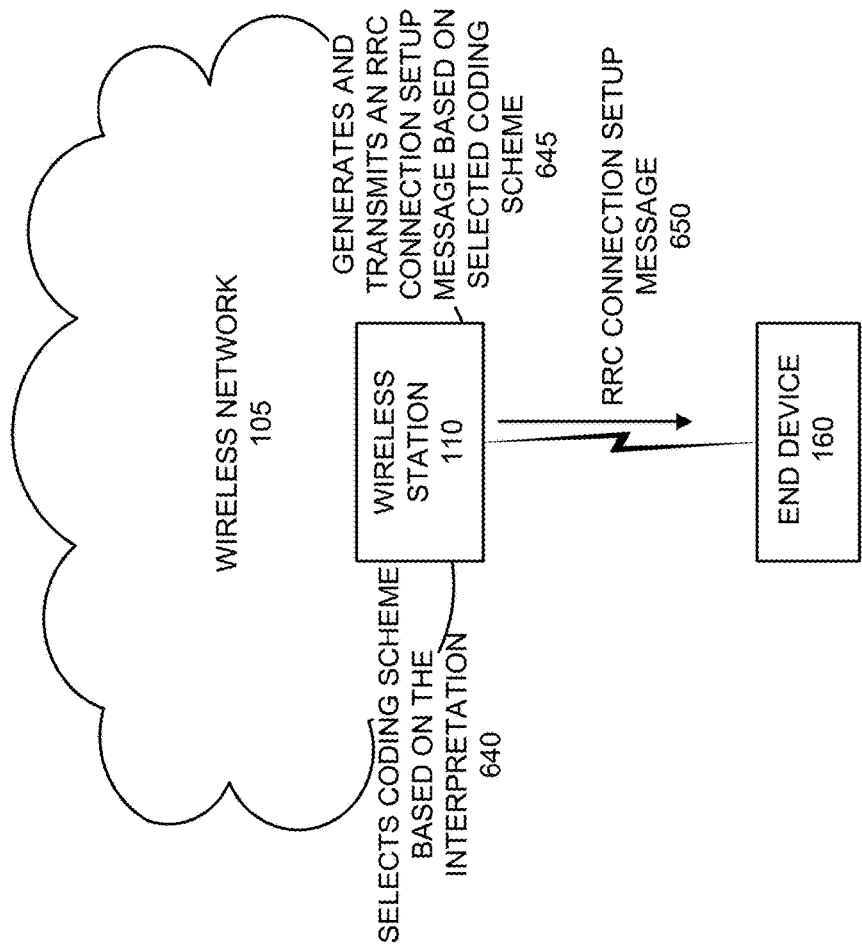

Referring to FIG. 6C, wireless station 110 selects a same type of FEC coding scheme based on the interpretation of the data 640. Wireless station 110 generates an RRC Connection Setup message based on the selection of the coding scheme 645. For example, radio resource control layer 405 generates the RRC Connection Setup message, based on the same FEC coding scheme, and transmits the RRC Connection Setup message to end device 160 via the control channel.

Figure 6D:
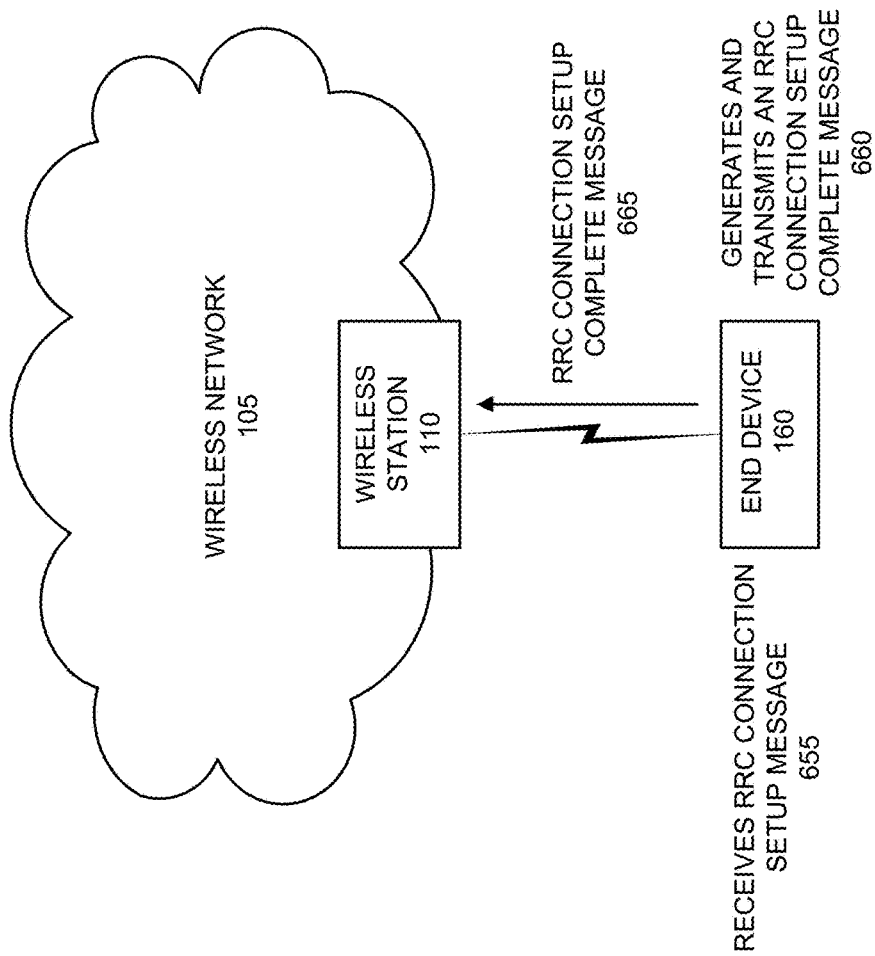

Referring to FIG. 6D, end device 160 receives the RRC Connection Setup message 655 via the control channel. End device 160 generates and transmits an RRC Connection Setup Complete message 660 in response to receiving the RRC Connection Setup message based on the FEC coding scheme. According to an exemplary implementation, the RRC Connection Setup Complete message 660 is FEC encoded according to the previously selected FEC coding scheme. According to other exemplary implementations, end device 160 may measure the condition of the control channel or the signal channel, query table 300, and select the FEC coding scheme, which may be of the same type or a different type. That is, end device 160 may measure the channel condition and select a correlated FEC coding scheme based on table 300. The RRC Connection Setup Complete message may be FEC encoded based on the selected FEC coding scheme. Additionally, when the type of FEC coding scheme changes (e.g., Turbo to LDPC, etc.), end device 160 may generate an information element that indicates the FEC type being used. For subsequent control messages or signaling messages transmitted by end device 160, end device 160 may dynamically change the type of FEC coding and/or the rate of the FEC coding based on the channel condition.

Figure 7:
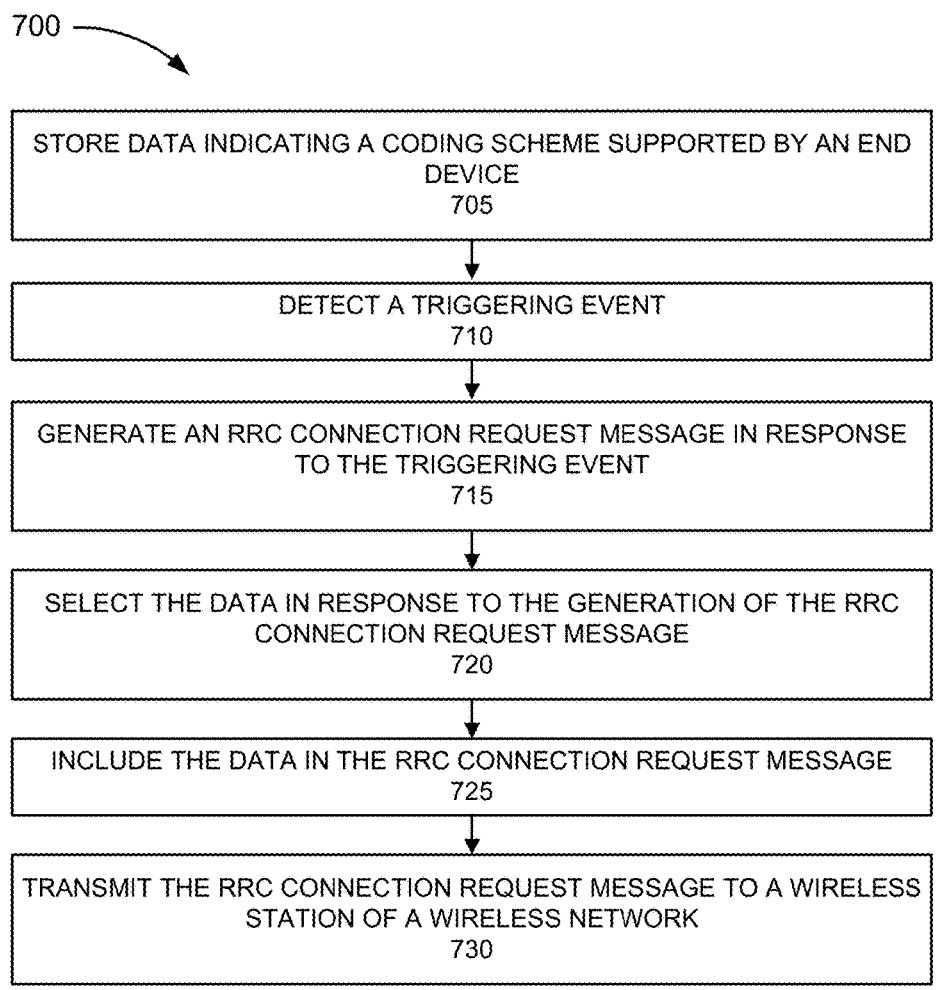
FIG. 7 is a flow diagram illustrating an exemplary process of the coding selection service performed by the end device.

FIG. 7 is a flow diagram illustrating an exemplary process 700 pertaining to the coding selection service. Process 700 is directed to a process previously described above with respect to FIG. 2A, as well as elsewhere in this description, in which end device 160 provides coding data, which indicates an FEC coding scheme supported by end device 160, in a connection request message transmitted to wireless station 110. According to an exemplary embodiment, end device 160, which includes radio resource control layer 205, performs steps of process 700. For example, processor 510 executes software 520 to perform the steps described. For purposes of description and illustration of process 700, it is assumed that storage 200 stores coding data that indicates a (single) FEC coding scheme supported by end device 160.

Referring to FIG. 7, block 705, process 700 may begin with an end device storing data that indicates an FEC coding scheme supported by the end device. For example, end device 160 stores data that indicates an FEC coding scheme (e.g., Turbo, LDPC, or some other type of FEC coding scheme) supported by end device 160. By way of further example, storage 200 stores the data.

In block 710, a triggering event is detected. For example, end device 160 may be configured to initiate a connection establishment procedure based on a triggering event or as a part of some other procedure (e.g., a random access procedure or the like). For example, the triggering event may be based on the powering up of end device 160 or some other type of triggering event (e.g., a request from an upper layer, turning off airplane mode, entering a network location, etc.).

In block 715, an RRC Connection Request message is generated in response to the detection of the triggering event. For example, end device 160 may generate an RRC Connection Request message in response to the detection of the triggering event or as a part of some other procedure. By way of further example, radio resource control layer 205 may generate the RRC Connection Request message.

In block 720, the data is selected in response to the generation of the RRC Connection Request message. For example, end device 160 reads and/or obtains the data stored in storage 200 in response to the generation of the RRC Connection Request message. By way of further example, as a part of the generation of the RRC Connection Request message, radio resource control layer 205 accesses storage 200. Radio resource control layer 205 may read the data or fetch the data stored in storage 200.

In block 725, the data is included in the RRC Connection Request message in response to the selection. For example, end device 160 includes the data (e.g., in a field) of the RRC Connection Request message in response to the selection of the data. By way of further example, radio resource control layer 205 generates an information element in which the data is represented based on a schema language.

In block 730, the RRC Connection Request message is transmitted to a wireless station of a wireless network. For example, end device 160 transmits the RRC Connection Request message, which includes the data, to wireless station 110 of wireless network 105 via a control channel.

Although FIG. 7 illustrates an exemplary process 700 of the coding selection service, according to other embodiments, process 700 may include additional operations, fewer operations, and/or different operations than those illustrated in FIG. 7 and described herein.

Figure 8:
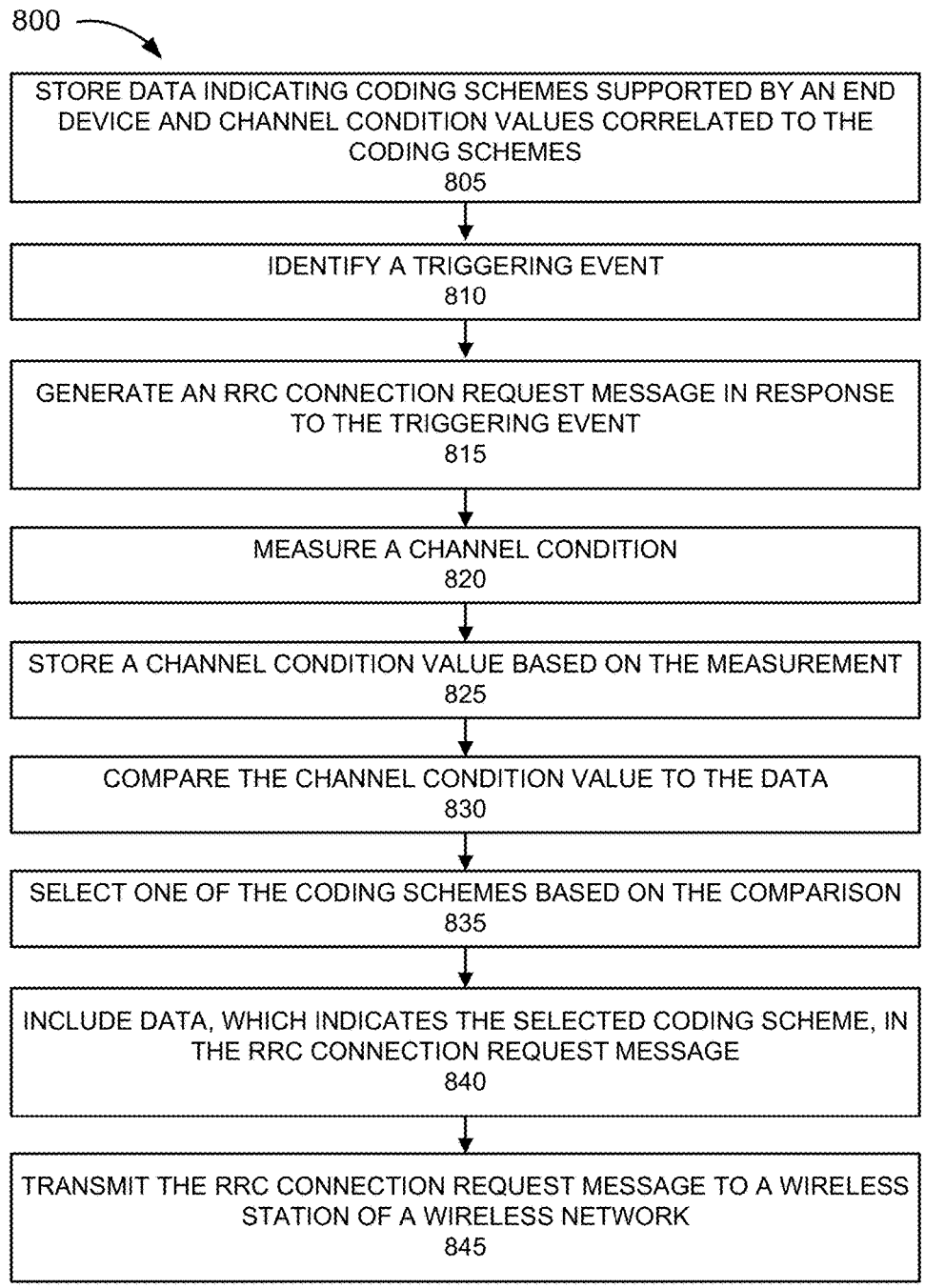
FIG. 8 is a flow diagram illustrating another exemplary process of the coding selection service performed by the end device.

FIG. 8 is a flow diagram illustrating an exemplary process 800 pertaining to the coding selection service. Process 800 is directed to a process previously described above with respect to FIG. 2B, as well as elsewhere in this description, in which end device 160 provides coding data, which indicates an FEC coding scheme supported by end device 160, in a connection request message transmitted to wireless station 110. In contrast to process 700, end device 160 supports multiple types of FEC coding schemes. According to an exemplary embodiment, end device 160, which includes coding selector 230 and radio resource control layer 235, performs steps of process 800. For example, processor 510 executes software 520 to perform the steps described. For purposes of description and illustration of process 800, it is assumed that storage 225 stores coding data that indicates multiple types of FEC coding schemes supported by end device 160, which are correlated to channel condition values (e.g., in table 300).

Referring to FIG. 8, block 805, process 800 may begin with an end device storing coding data that indicates coding schemes supported by the end device and channel condition values correlated to the coding schemes. For example, end device 160 stores data that indicates multiple types of FEC coding schemes supported by end device 160 and channel condition values correlated to the multiple types of coding schemes. By way of further example, storage 225 stores the data. For example, storage 225 may store table 300.

In block 810, a triggering event is detected. For example, end device 160 may be configured to initiate a connection establishment procedure based on a triggering event or as a part of some other procedure (e.g., a random access procedure or the like). For example, the triggering event may be based on the powering up of end device 160 or some other type of triggering event (e.g., a request from an upper layer, turning off airplane mode, entering a network location, etc.).

In block 815, an RRC Connection Request message is generated in response to the detection of the triggering event. For example, end device 160 may generate an RRC Connection Request message in response to the detection of the triggering event or as a part of some other procedure.

In block 820, a channel condition is measured. For example, end device 160 measures a channel condition. By way of example, the channel condition is SNR. According to other examples, the channel condition may be different than SNR, as described herein.

In block 825, a channel condition value is stored based on the measurement. For example, end device 160 stores the measured channel condition value in storage 225 or in some other memory/storage space.

In block 830, the channel condition value is compared to the data. For example, end device 160 compares the measured channel condition value to channel condition values stored in the data. By way of further example, coding selector 230 compares the measured channel condition value to channel condition values stored in table 300 (e.g., channel condition field 310).

In block 835, one of the coding schemes is selected based on the comparison. For example, end device 160 selects one of the FEC coding schemes supported by end device 160 based on the result of the comparison. By way of further example, coding selector 230 determines which channel condition value stored in profiles 335 matches or best matches the measured channel condition value.

In block 840, the data is included in the RRC Connection Request message in response to the selection. For example, end device 160 includes the data (e.g., in a field) of the RRC Connection Request message in response to the selection of the data. By way of further example, radio resource control layer 205 generates an information element in which the data is represented based on a schema language.

In block 845, the RRC Connection Request message is transmitted to a wireless station of a wireless network. For example, end device 160 transmits the RRC Connection Request message, which includes the data, to wireless station 110 of wireless network 105 via a control channel.

Although FIG. 8 illustrates an exemplary process 800 of the coding selection service, according to other embodiments, process 800 may include additional operations, fewer operations, and/or different operations than those illustrated in FIG. 8 and described herein. For example, in block 835 the selection of the type of FEC coding scheme may be based on other factors (e.g., either in combination with other factors (e.g., channel condition) or individually). By way of example, table 300 may include an establishment cause field that indicates the nature of the RRC Connection Request message. As an example, in LTE, the establishment cause may include delayTolerantAccess, mo-Data, emergency, highPriorityAccess, int-Access, or mo-Signalling. A 5G wireless network may support a similar service and field in a connection request. Thus, for example, the type of FEC coding scheme selected for emergency or high priority access may be different compared to other establishment causes. In this way, the establishment cause may correlate to an FEC coding scheme and, other factors (e.g., channel condition, etc.).

Figure 9:
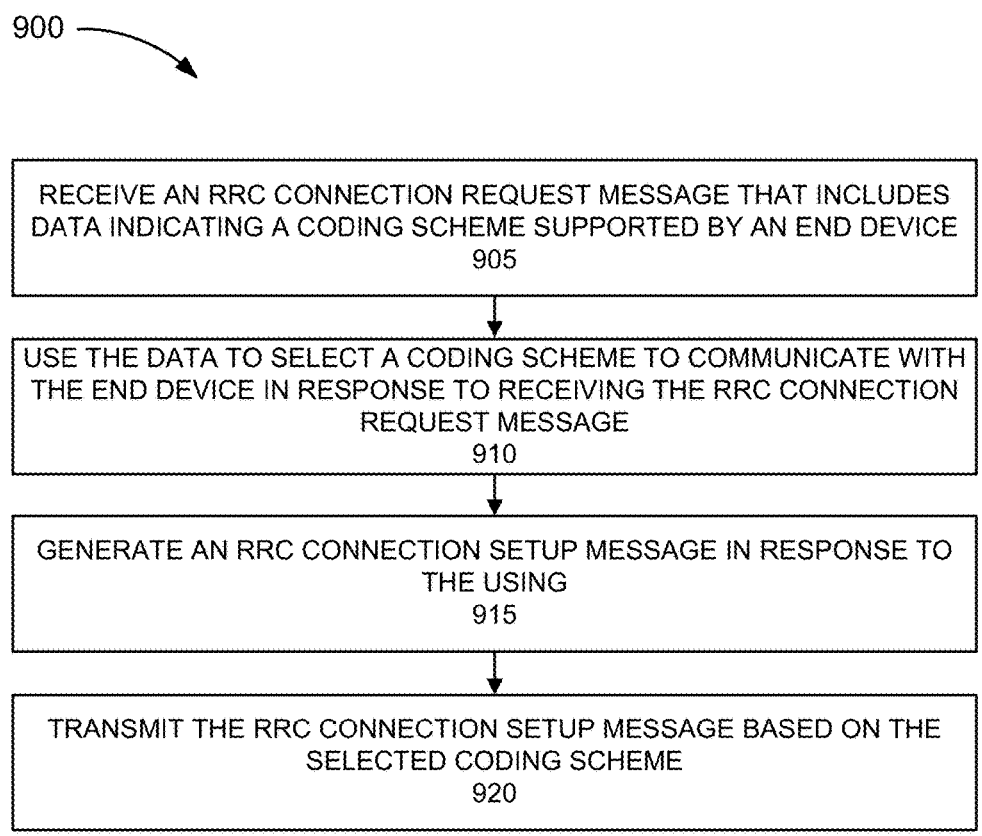
FIG. 9 is a flow diagram illustrating an exemplary process of the coding selection service performed by the wireless station.

FIG. 9 is a flow diagram illustrating an exemplary process 900 pertaining to the coding selection service. Process 900 is directed to a process previously described above with respect to FIG. 4, as well as elsewhere in this description, in which wireless station 110 selects the type of FEC coding scheme to use to communicate with end device 160 via a control channel or a signaling channel based on receipt of a connection request message that carries data indicating a type of FEC coding scheme supported by end device 160. According to an exemplary embodiment, wireless station 110, which includes radio resource control layer 405, performs steps of process 900. For example, processor 510 executes software 520 to perform the steps described.

Referring to FIG. 9, block 905, process 900 may begin with an RRC Connection Request message, which includes data indicating a coding scheme supported by an end device, being received. For example, wireless station 110 receives an RRC Connection Request message from end device 160. The RRC Connection Request message includes data indicating a type of FEC coding scheme supported by the end device.

In block 910, the data is used, in response to receiving the RRC Connection Request message, to select a coding scheme to communicate with the end device. For example, wireless station 110 selects a same type of FEC coding scheme based on an interpretation of the data included in the RRC Connection Request message.

In block 915, an RRC Connection Setup message is generated based on the selection of the coding scheme. For example, wireless station 110 generates an RRC Connection Setup message in response to selecting the same type of FEC coding scheme. By way of further example, radio resource control layer 405 generates the RRC Connection Setup message based on the selected FEC coding scheme.

In block 920, the RRC Connection Setup message is transmitted to the end device. For example, wireless station 110 transmits the RRC Connection Setup message to end device 160 via a control channel.

Although FIG. 9 illustrates an exemplary process 900 of the coding selection service, according to other embodiments, process 900 may include additional operations, fewer operations, and/or different operations than those illustrated in FIG. 9 and described herein.

Turning to another aspect of this description, Turbo coding is used for Third Generation Partnership Project (3GPP) LTE and has better performance (e.g., spectral efficiency (SE) versus signal-to-noise (SNR)) at low SNRs than LDPC coding. However, for example, Turbo coding may be more complex than LDPC coding and use of Turbo coding may become impractical at bit rates greater than 2 Gigabits per second (Gbps).

According to an exemplary embodiment, a 5G wireless system or other type of wireless system dynamically selects an FEC coding scheme based on a channel condition associated with a data channel (e.g., in contrast to a signaling channel or a control channel). According to an exemplary implementation, the channel condition includes SNR. According to other exemplary implementations, the channel condition may include other types of channel conditions, in addition to or instead of, SNR. In this way, the selection of the FEC coding scheme used to communicate between the end device and the wireless network via a data channel may be adaptive. Embodiments of the adaptive coding selection service may be implemented in environment 100, as illustrated in FIG. 1 and described herein.

FIG. 10 is a diagram illustrating exemplary coding data that is stored in an exemplary table 1000. For example, wireless station 110 and end device 150 stores the same table 1000. According to an exemplary implementation, table 1000 includes an index field 1005, a coding type field 1010, a code rate field 1015, a channel condition field 1020, and a modulation type field 1025. As further illustrated, table 1000 includes profiles 1030-1 through 1030-Z (also referred to as profiles 1030 and, individually and generically as profile 1030). Each profile 1030 includes a grouping of data fields 1005 through 1025. Each profile 1030 includes at least one instance of coding data that is different from another profile 1030.

Index field 1005 stores data that indicates a unique value representative of a particular profile 1030. Coding type field 1010 stores data that indicates a type of FEC coding. For example, coding type field 1010 may store data that indicates Turbo coding, LDPC coding, Polar coding, or some other type of coding. Code rate field 1015 stores data that indicates a code rate of an FEC coding scheme. Channel condition field 1020 stores data that indicates a channel condition. According to an exemplary implementation, the channel condition is SNR. According to such an implementation, channel condition field 1020 stores an SNR value. According to other exemplary implementations, channel condition field 1020 may store one or multiple channel condition values including or excluding an SNR value, such as an SINR value, an RSSI value, an RSRP value, an RSRQ value, or the like. Modulation type field 1025 stores data that indicates a type of modulation scheme. For example, modulation type field 1025 may store data that indicates Quadrature Amplitude Modulation (e.g., M-QAM, such as 4-QAM, 16-QAM, 64-QAM, 256-QAM, etc.), Quadrature Phase Shift Key (QPSK), Binary Phase Shift Key (BPSK), or some other type of modulation scheme.

According to other implementations, table 1000 may store additional instances of coding data, fewer instances of coding data, and/or different types of coding data.

According to an exemplary embodiment of the adaptive coding selection service, end device 160 measures a channel condition of a data channel. When end device 160 needs to transmit data via the data channel, end device 160 uses table 1000 to select a profile 1030. For example, end device 160 includes logic (e.g., coding selector 210) that compares the measured channel condition value to the data stored in channel condition value 1020. Based on the result of the comparison, end device 160 selects the channel condition value that matches or best matches the measured channel condition value and, in turn selects the coding type and code rate stored in coding type field 1010 and code rate field 1015 of the selected profile 1030. End device 160 may also use the correlated modulation scheme stored in modulation type field 1025 when generating the data for transmission. In this way, end device 160 may select a type of FEC coding and rate in an adaptive manner based on a channel condition of the data channel.

According to an exemplary embodiment of the adaptive coding selection service, end device 160 measures a channel condition of a data channel and reports the measurements to wireless station 110. For example, end device 160 may transmit, via a control channel, a channel quality indicator (CQI) report that includes values indicative of channel conditions of the data channel. End device 160 may be configured to transmit the CQI report periodically. According to an exemplary embodiment, end device 160 includes one of the index values of table 1000, which corresponds to a particular profile 1030. For example, in a manner previously described, end device 160 compares the measured channel condition value to channel condition values stored in channel condition field 1020 of profiles 1030. End device 160 selects profile 1030 that includes a channel condition value that matches or best matches the measured channel condition value and, in turn, includes the index value of the selected profile 1030 in the CQI report.

According to an exemplary embodiment, when wireless station 110 needs to transmit data via the data channel to end device 160, wireless station 110 uses the index value included in the CQI report and table 1000 to select the FEC code and rate for transmission of the data to end device 160. For example, wireless station 110 includes logic that inspects and interprets the CQI report and queries table 1000 to determine the coding scheme and rate. Wireless station 110 may also use the correlated modulation type indicated in the corresponding profile 1030.

FIGS. 11A-11D are diagrams illustrating exemplary processes of the adaptive coding selection service. The adaptive coding selection service may be performed subsequent to end device 160 establishing a wireless connection with wireless network 105 via wireless station 110, and a bearer channel or a data channel being available or established for use by end device 160.

Figure 11A:
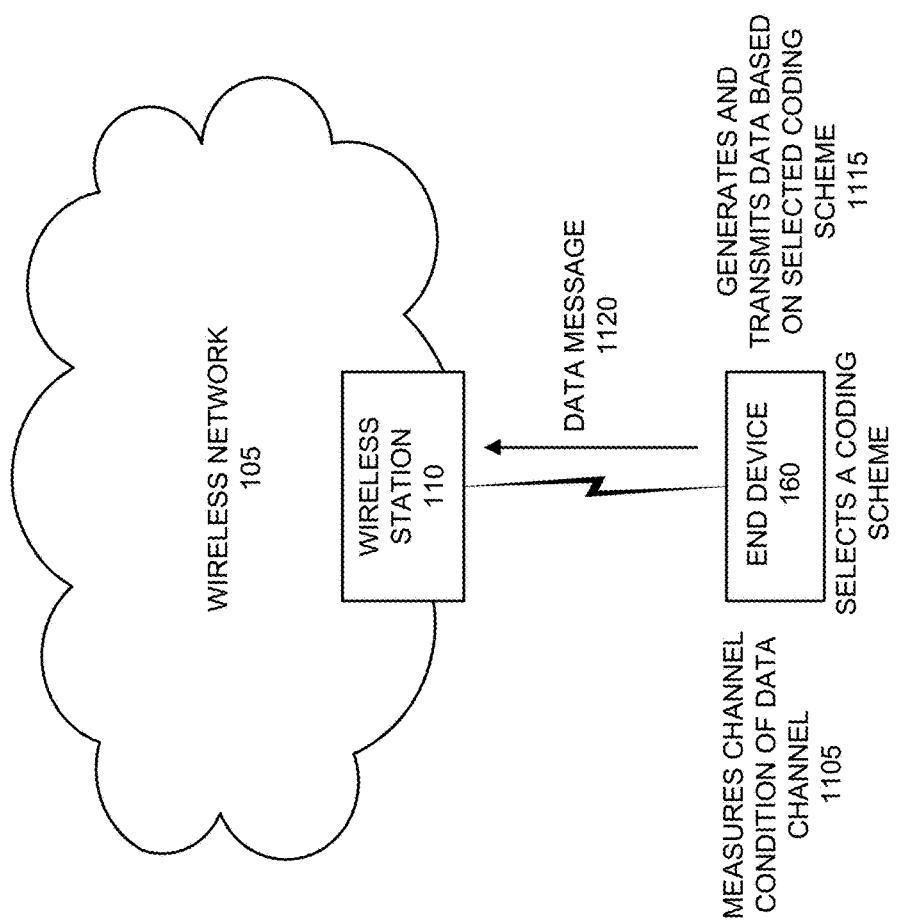
FIGS. 11A-11D are diagrams illustrating an exemplary process of the adaptive coding selection service performed in the exemplary environment.

Referring to FIG. 11A, assume that end device 160 has data to transmit and has been allocated resources to transmit the data via a data channel. In response, end device 160 measures a channel condition of a data channel 1105. For example, end device 160 measures SNR and/or another type channel condition, as described herein. End device 160 selects a type of FEC coding to use based on the channel condition measurement. For example, end device 160 compares the measured channel condition value to channel condition values of profiles 1030. End device 160 selects the profile 1030 that includes the channel condition value that matches or best matches the measured channel condition value. End device 160 generates and transmits the data based on the selected FEC coding scheme. For example, end device 160 uses the coding data of the selected profile 1030 to generate and transmit the data message 1120.

Figure 11B:
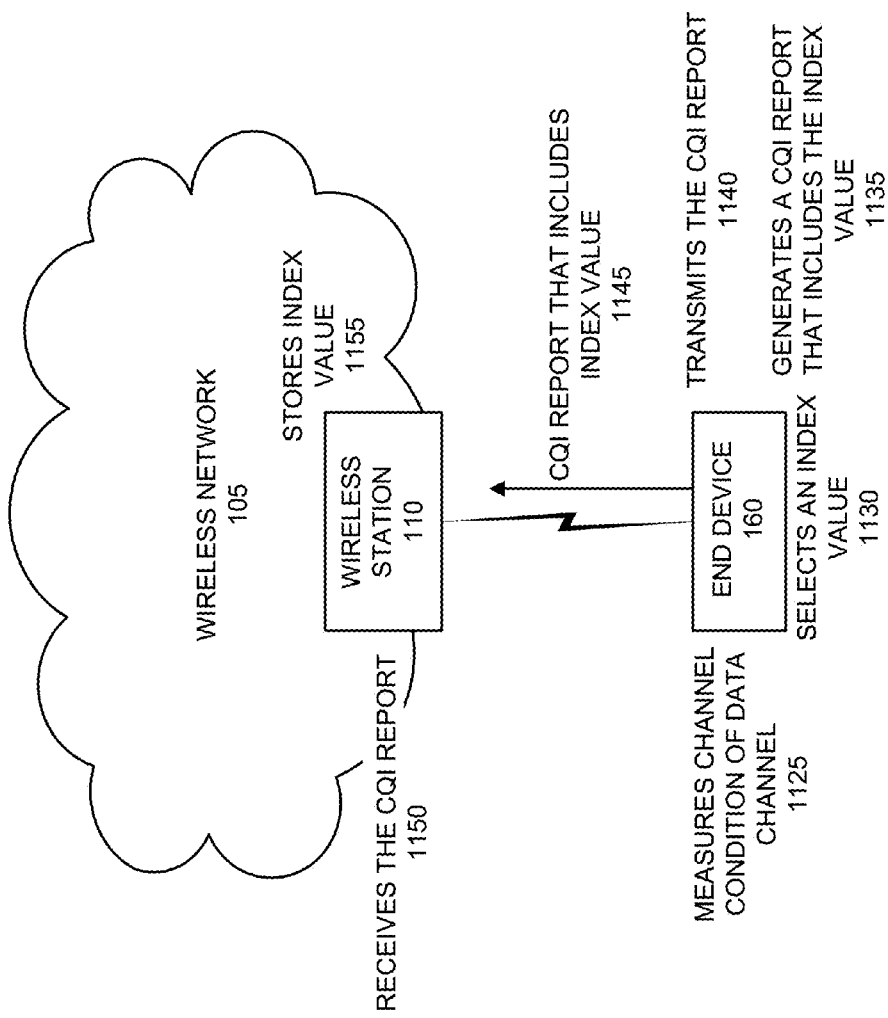

Referring to FIG. 11B, end device 160 measures a channel condition of a data channel 1125. For example, end device 160 measures SNR and/or another type channel condition, as described herein. End device 160 selects a profile 1030 from table 1000 based on the measured channel condition value and a comparison of the channel condition values stored in table 1000. In response to the selection, end device 160 generates a CQI report that includes the index value stored in index field 1005 of selected profile 1030. End device 160 transmits the CQI report 1140 to wireless station 110 via a control channel. Wireless station 110 receives the CQI report that includes the index value 1150. Wireless station 110 stores the index value 1155.

Figure 11C:
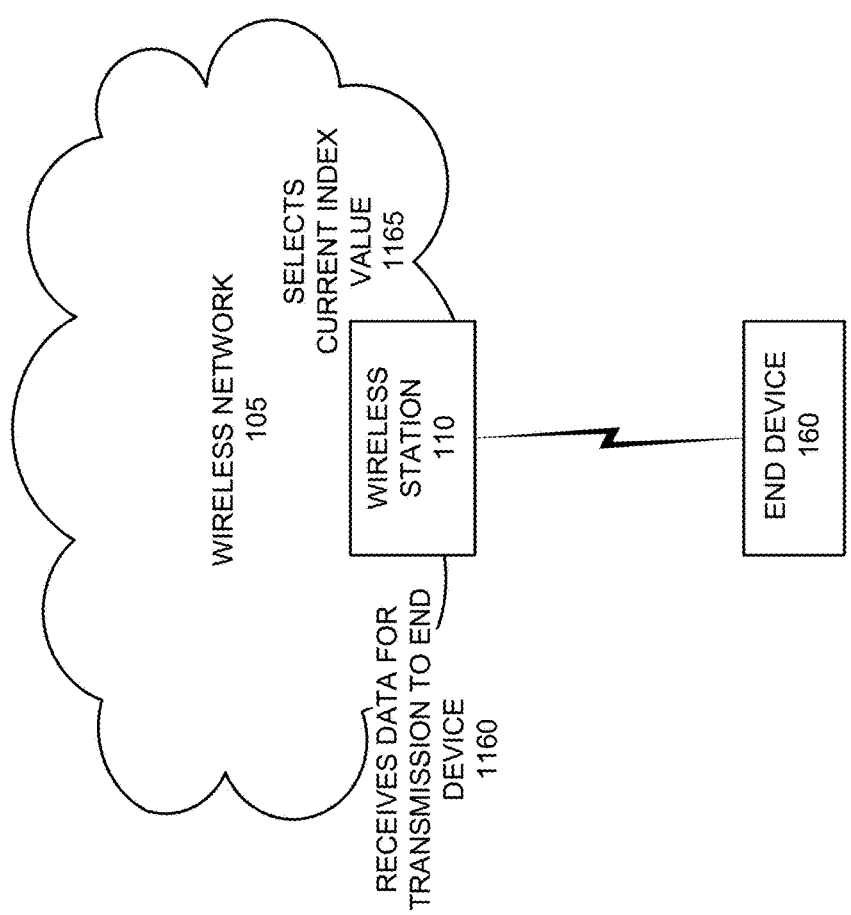
Figure 11D:
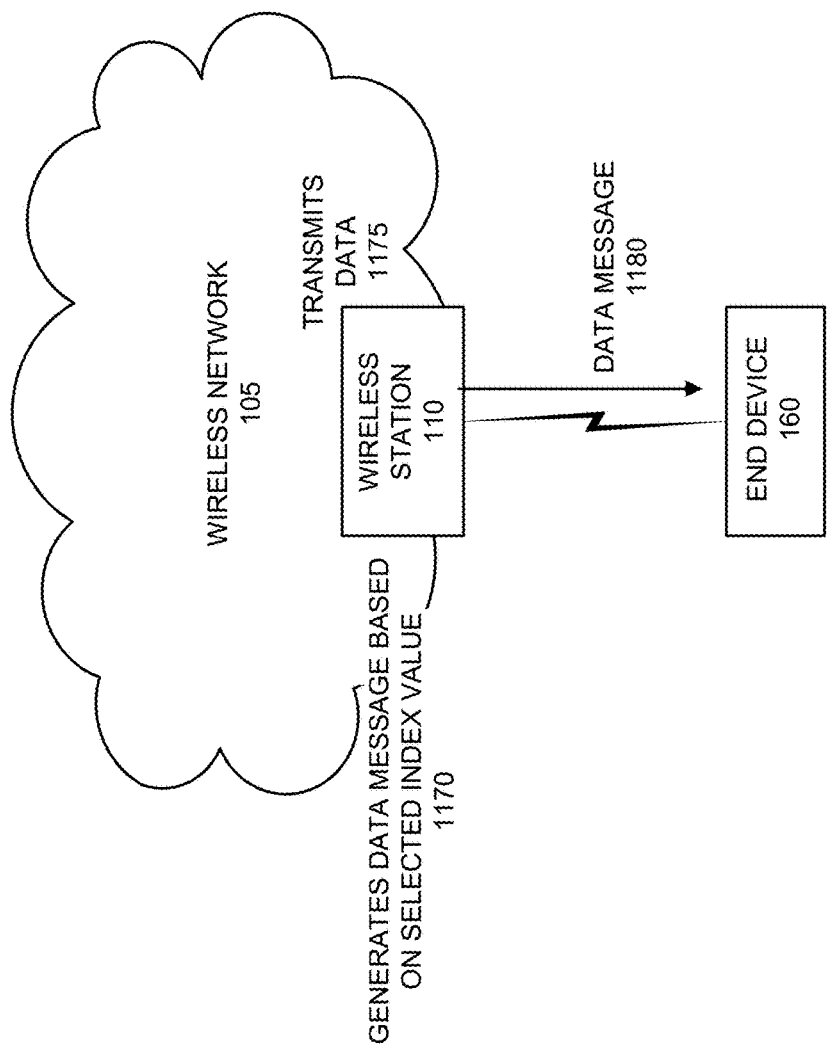

Referring to FIG. 11C, wireless station 110 receives data for transmission via a data channel to end device 1160. Wireless station 110 selects the currently stored index value received from end device 160 in the CQI report. Referring to FIG. 11D, wireless station 110 generates a data message based on the selected index value 1170, and transmits the data message 1175 to end device 160 via the data channel.

Figure 12:
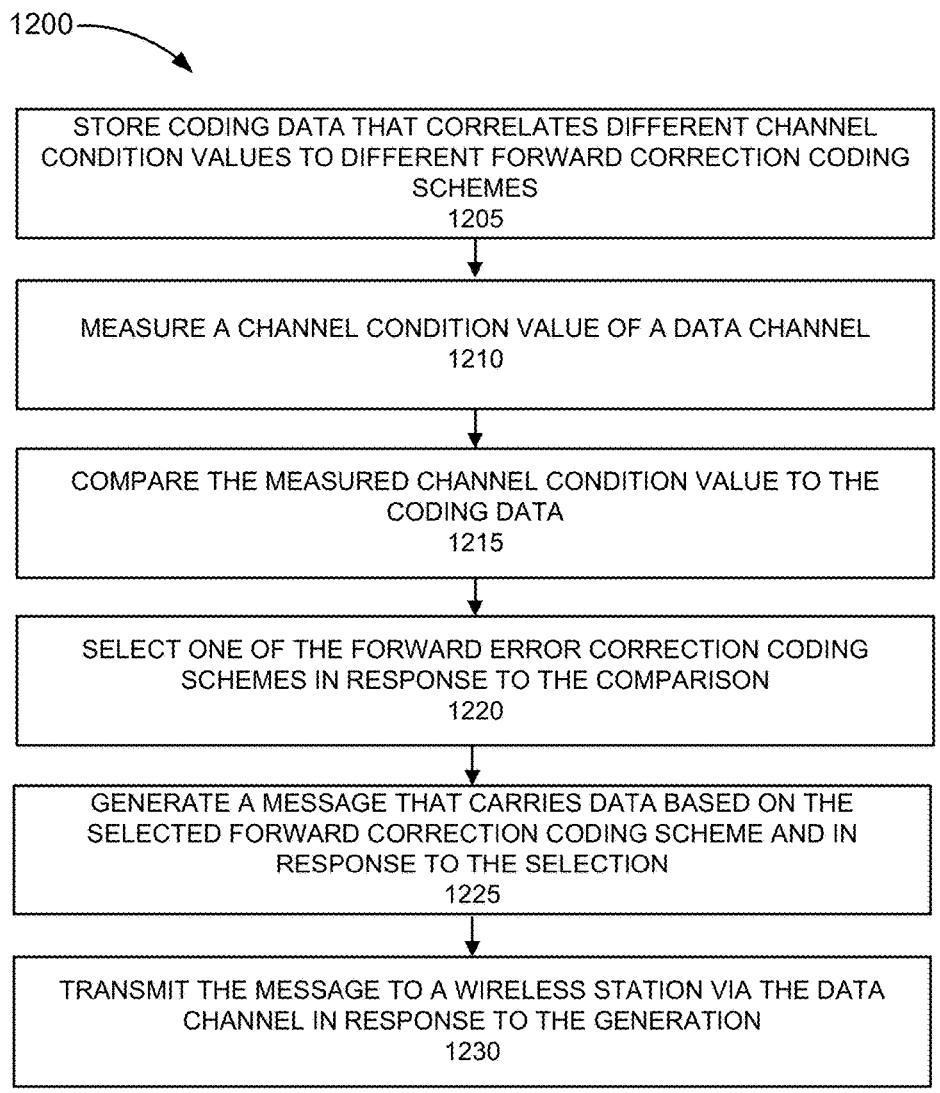
FIG. 12 is a flow diagram illustrating an exemplary process of the adaptive coding selection service performed by the end device.

FIG. 12 is a flow diagram illustrating an exemplary process 1200 pertaining to the adaptive coding selection service. Process 1200 is directed to a process previously described above with respect to FIG. 11A-11D, as well as elsewhere in this description, in which end device 160 selects a type of FEC coding and rate based on a measurement of a channel condition of a data channel and the stored coding data. According to an exemplary embodiment, end device 160 performs steps of process 1200. For example, processor 510 executes software 520 to perform the steps described.

Referring to FIG. 12, block 1205, process 1200 may begin with storing coding data that correlates different channel conditions of a data channel to different types of FEC codes and rates. For example, end device 160 stores table 1000. In block 1210, a channel condition value of the data channel is measured. For example, end device 160 measures a channel condition of the data channel. According to an exemplary implementation, the channel condition is SNR. According to other exemplary implementations, the channel condition may be a different type of channel condition, as described herein.

In block 1215, a measured channel condition value is compared to the coding data. For example, end device 160 compares the measured channel condition value to channel condition values stored in channel condition field 1020 of table 1000. In block 1220, one of the FEC codes and rates is selected in response to the comparison. For example, end device 160 selects a channel condition value of table 1000 that matches or best matches the measured channel condition value. End device 160 selects a type of FEC coding and rate that correlate to the channel condition value of table 1000.

In block 1225, a message that carries data is generated based on the selected FEC code and rate and in response to the selection. For example, end device 160 generates a message to carry data that is to be transmitted by end device 160 to wireless network 105 via wireless station 110. End device 160 generates the message based on the selected FEC code and rate. End device 160 may also generate the message based on a modulation scheme that correlates to the selected channel condition value of table 1000. The message may pertain to a data session between end device 160 and another end device or a network device. In block 1230, the message is transmitted via the data channel to a wireless station in response to the generation. For example, end device 160 transmits the message via the data channel to the other end device or network device.

Although FIG. 12 illustrates an exemplary process 1200 of the adaptive coding selection service, according to other embodiments, process 1200 may include additional operations, fewer operations, and/or different operations than those illustrated in FIG. 12 and described herein.

Figure 13:
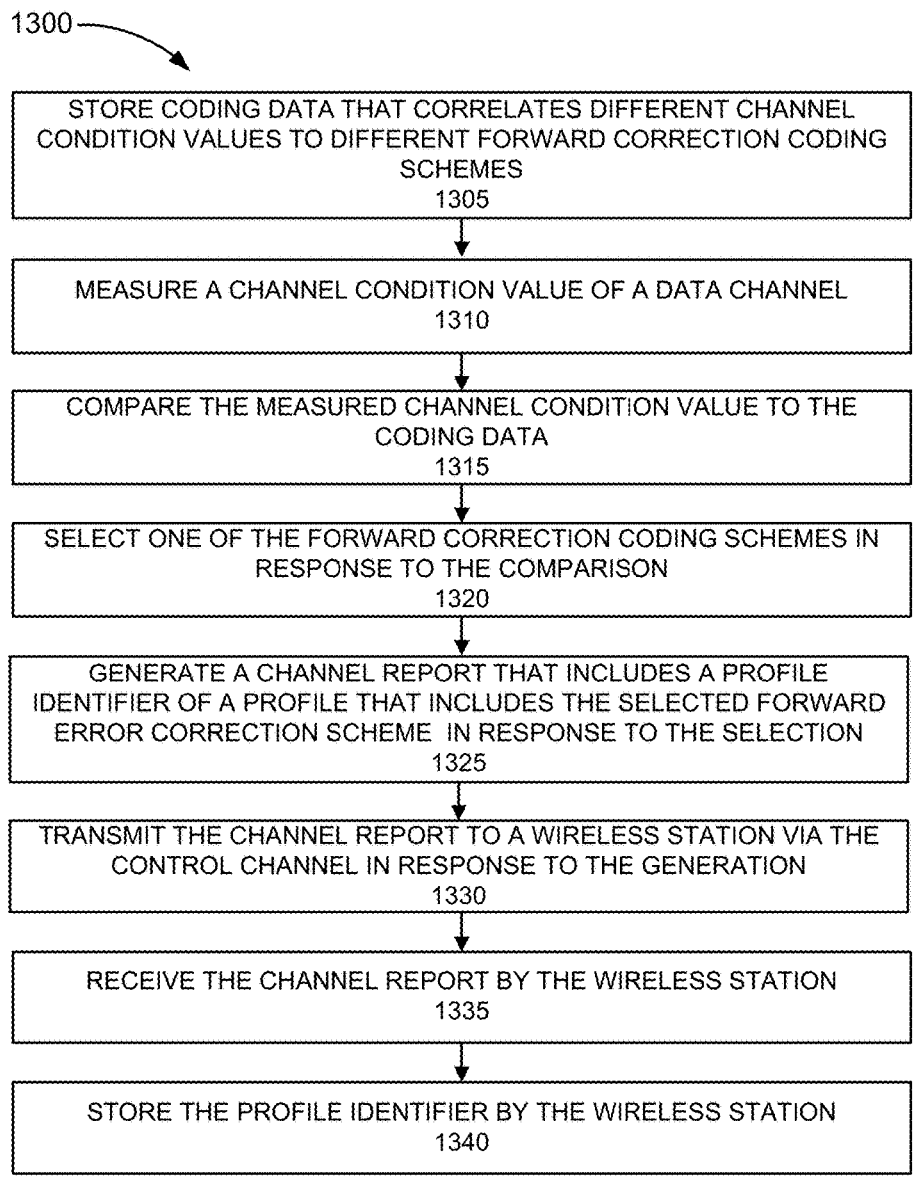
FIG. 13 is a flow diagram illustrating another exemplary process of the adaptive coding selection service performed by the end device.

FIG. 13 is a flow diagram illustrating an exemplary process 1300 pertaining to the adaptive coding selection service. Process 1300 is directed to a process previously described above with respect to FIGS. 11A-11D, as well as elsewhere in this description, in which end device 160 includes an index value in a channel report transmitted to wireless station, the index value indicating a profile that includes a correlation between a channel condition value and a type of FEC code and rate. Additionally, process 1300 includes wireless station receiving the channel report and storing the index value. According to an exemplary embodiment, end device 160 performs steps of process 1300 and wireless station performs steps of process 1300. For example, processor 510 executes software 520 to perform the steps described.

Referring to FIG. 13, process 1300 may begin, in block 1305, with storing coding data that correlates different channel conditions of a data channel to different types of FEC codes and rates. For example, end device 160 stores a table 1000. In block 1310, a channel condition value of the data channel is measured. For example, end device 160 measures a channel condition of the data channel. According to an exemplary implementation, the channel condition is SNR. According to other exemplary implementations, the channel condition may be a different type of channel condition, as described herein.

In block 1315, a measured channel condition value is compared to the coding data. For example, end device 160 compares the measured channel condition value to channel condition values stored in channel condition field 1020 of table 1000. In block 1320, one of the FEC codes and rates is selected in response to the comparison. For example, end device 160 selects a channel condition value of table 1000 that matches or best matches the measured channel condition value. End device 160 selects a profile identifier (e.g., an index value of index field 1005) of a profile (e.g., profile 1030) that includes the selected type of FEC code and rate that correlate to the channel condition value of table 1000.

In block 1325, a channel report is generated, in response to the selection, which includes the profile identifier of the profile that includes the selected type of FEC code and rate. For example, end device 160 generates a CQI report that includes the profile identifier of profile 1030.

In block 1330, the channel report is transmitted to the wireless station in response to the generation. For example, end device 160 transmits the channel report via a control channel.

In block 1335, the channel report is received by the wireless station. For example, wireless station 110 of wireless network 105 receives the channel report. In block 1340, the profile identifier is stored by the wireless station. For example, the profile identifier is stored by wireless station 110. As described in relation to FIG. 14 and elsewhere, wireless station 110 uses the profile identifier to select a type of FEC and rate, as well as a modulation scheme, when wireless station 110 has data to transmit to end device 160 via the data channel.

Although FIG. 13 illustrates an exemplary process 1300 of the adaptive coding selection service, according to other embodiments, process 1300 may include additional operations, fewer operations, and/or different operations than those illustrated in FIG. 13 and described herein.

Figure 14:
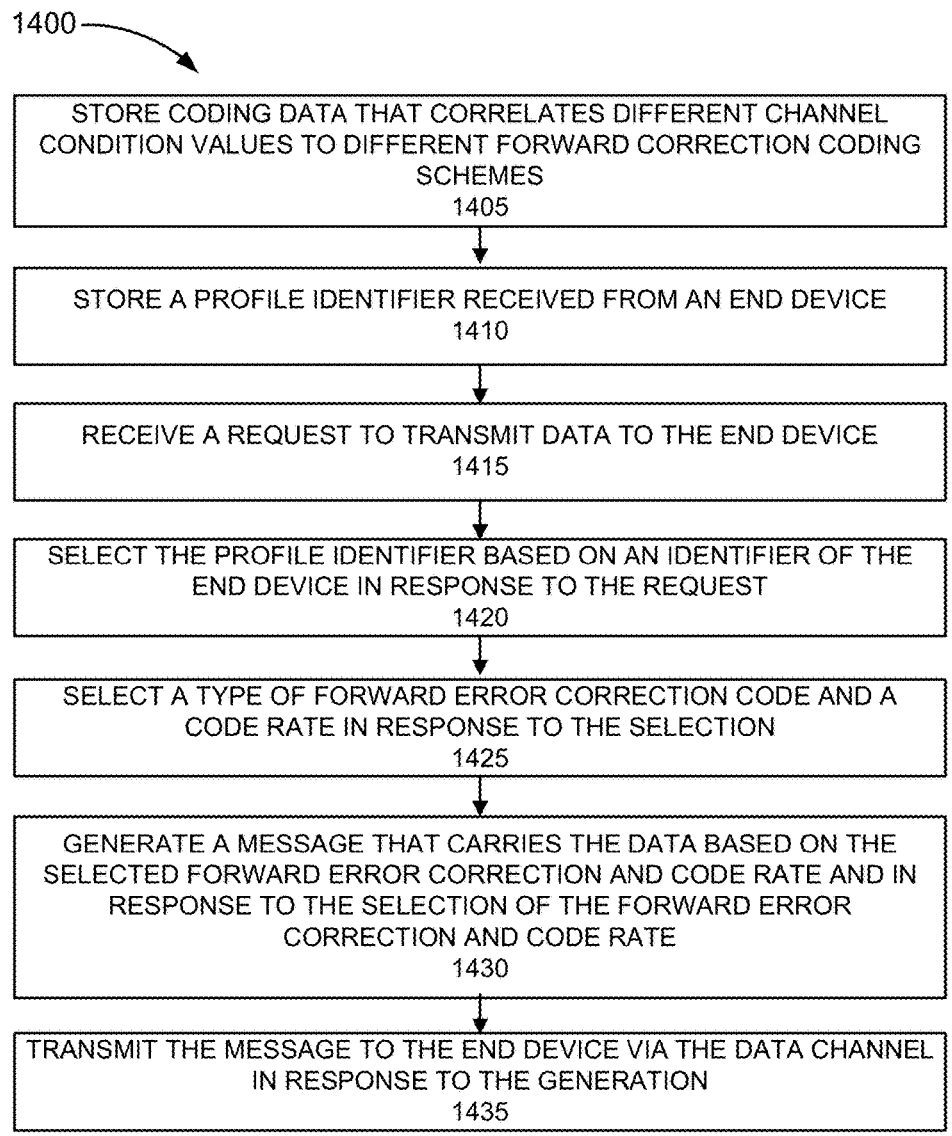
FIG. 14 is a flow diagram illustrating an exemplary process of the adaptive coding selection service performed by the wireless station.

FIG. 14 is a flow diagram illustrating an exemplary process 1400 pertaining to the adaptive coding selection service. Process 1400 is directed to a process previously described above with respect to FIGS. 11A-11D, as well as elsewhere in this description, in which wireless station 110 selects a type of FEC coding and rate to use to communicate via a bearer channel or a data channel with end device 160 based on a profile identifier. For example, as previously described, both end device 160 and wireless station 110 stores the same coding data, such as that discussed in relation to table 1000, which includes index values. According to an exemplary embodiment, wireless station 110 performs steps of process 1400. For example, processor 510 executes software 520 to perform the steps described.

Referring to FIG. 14, process 1400 may begin, in block 1405, with storing coding data that correlates different channel conditions of a data channel to different types of FEC codes and rates. For example, wireless station 110 stores table 1000.

In block 1410, a profile identifier received from an end device is stored. For example, wireless station 110 stores a profile identifier, as described in relation to block 1340 of process 1300. By way of further example, FIG. 15 is a diagram illustrating an exemplary table 1500 that stores the profile identifier. According to an exemplary implementation, table 1500 includes an end device identifier field 1505 and a profile identifier field 1510. As further illustrated, table 1500 includes profiles 1515-1 through 1515-Z (also referred to as profiles 1515 and, individually and generically as profile 1515). Each profile 1515 includes a grouping of data fields 1505 and 1510. Each profile 1515 includes at least one instance of data that is different from another profile 1515. End device identifier field 1505 stores a unique identifier of end device 160. For example, the end device identifier may be implemented as an International Mobile Subscriber Identity (IMSI) or some other type of unique identifier (e.g., an International Mobile Station Equipment Identity (IMEI), a Mobile Equipment Identifier (MEID), an Internet Protocol (IP) address, etc.). Profile identifier field 1510 stores data that indicates a profile identifier. For example, the profile identifier may be implemented as an index value stored in index field 1005 of table 1000. According to other implementations, table 1500 may store additional instances of data and/or different types of data.

Referring back to FIG. 14, in block 1415, a request to transmit data to the end device is received. For example, wireless station 110 may receive data associated with a communication session between end device 160 and another device (e.g., another end device, a network device, etc.).

In block 1420, a profile identifier is selected based on an identifier of the end device and in response to the request. For example, wireless station 110 may query table 1500 to select the profile identifier stored in profile identifier field 1510 of table 1500 based on the identifier of end device 160 to which the data is destined.

In block 1425, a type of forward error correction and code rate is selected in response to the selection of the profile identifier. For example, wireless station 110 selects a profile 1030 based on the profile identifier and, in turn selects the forward error correction and code rate included in the selected profile 1030.

In block 1430, a message is generated that carries the requested data to be transmitted, based on the selected forward error correction and code rate and in response to the selection of the forward error correction and code rate. For example, wireless station 110 generates a message that carries the data based on the selected forward error correction code and code rate. Wireless station 110 may also generate the message based on the modulation type included in the selected profile 1030.

In block 1435, the message is transmitted to the end device via the data channel in response to the generation of the message. For example, wireless station 110 transmits the message via the data channel to end device 160 in response to the generation of the message.

Although FIG. 14 illustrates an exemplary process 1400 of the adaptive coding selection service, according to other embodiments, process 1400 may include additional operations, fewer operations, and/or different operations than those illustrated in FIG. 14 and described herein.

The foregoing description of embodiments provides illustration, but is not intended to be exhaustive or to limit the embodiments to the precise form disclosed. Accordingly, modifications to the embodiments described herein may be possible The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 7-9 and 12-14, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 510, etc.), or a combination of hardware and software (e.g., software 520). The embodiments have been described without reference to the specific software code since the software code can be designed to implement the embodiments based on the description herein and commercially available software design environments/languages.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The word "exemplary" is used herein to mean "serving as an example." Any embodiment or implementation described as "exemplary" is not necessarily to be construed as preferred or advantageous over other embodiments or implementations.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 510) of a computational device. A non-transitory storage medium includes one or more of the storage mediums described in relation to memory/storage 515.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction described in the present application should be construed as critical or essential to the embodiments described herein unless explicitly described as such.

What is claimed is:

1. A method comprising:
    storing, by an end device, one or multiple instances of first data that indicate one or multiple types of forward error correction (FEC) coding schemes supported by the end device;
    generating, by the end device, a radio resource control connection request;
    selecting, by the end device, one of the one or multiple instances of the first data during the generating;
    including, by the end device, the one of the one or multiple instances of the first data in the radio resource control connection request, wherein the including comprises:
        generating an information element that includes the one of the one or multiple instances of the first data; and
        including the information element in the radio resource control connection request; and
    transmitting, by the end device, the radio resource control connection request to a wireless station of a wireless network.

2. The method of claim 1, wherein the one or multiple types of FEC channel coding schemes include one or more of Turbo coding or Low Density Parity Check coding.

3. The method of claim 1, further comprising:
    measuring, by the end device, a condition of a channel;
    storing, by the end device, a channel condition value based on the measuring, and wherein the selecting further comprises:
    comparing the stored channel condition value to channel condition values included in second data; and
    identifying one of the channel condition values that matches the stored channel condition value.

4. The method of claim 3, further comprising:
    storing, by the end device, the second data, wherein the multiple instances of the first data indicate different types of FEC coding schemes, and multiple instances of the second data indicate the channel condition values that correlate to the multiple instances of the first data, and the selecting further comprises:
    in response to the identifying, selecting one of the different types of FEC coding schemes of the first data that correlates to one of the channel condition values of the second data.

5. The method of claim 3, wherein the measuring comprises:
    measuring a signal-to-noise ratio of the channel.

6. The method of claim 1, further comprising:
    receiving, by the wireless station, the radio resource control connection request;
    interpreting, by the wireless station, the one of the one or multiple instances of the first data included in the radio resource control connection request;
    selecting, by the wireless station, a same type of FEC coding scheme to communicate with the end device based on the interpreting;
    generating, by the wireless station, a radio resource control connection setup based on the selected type of FEC coding scheme; and
    transmitting, by the wireless station, the radio resource control connection setup to the end device in response to the generating.

7. The method of claim 1, wherein the one of the one or multiple instances of the first data further indicates a coding rate.

8. The method of claim 1, wherein the selecting further comprises:
    selecting the one of the one or multiple instances of the first data based on an establishment cause associated with the radio resource control connection request.

9. An end device comprising:
    a communication interface;
    a memory, wherein the memory stores instructions; and
    a processor, wherein the processor executes the instructions to:
        store one or multiple instances of first data that indicate one or multiple types of forward error correction (FEC) coding schemes supported by the end device;
        generate a radio resource control connection request;
        select one of the one or multiple instances of the first data during the generation of the radio resource control connection request;
        include the one of the one or multiple instances of the first data in the radio resource control connection request wherein, when including, the processor further executes the instructions to:
            generate an information element that includes the one of the one or multiple instances of the first data; and
            include the information element in the radio resource control connection request; and
        transmit, via the communication interface, the radio resource control connection request to a wireless station of a wireless network.

10. The end device of claim 9, wherein the one or multiple types of FEC coding schemes include one or more of Turbo coding or Low Density Parity Check coding.

11. The end device of claim 9, wherein the processor further executes the instructions to:
    measure a condition of a channel;
    store a channel condition value based on the measurement, and wherein when selecting, the processor further executes the instructions to:
    compare the stored channel condition value to channel condition values included in a second data; and
    identify one of the channel condition values that matches the stored channel condition value.

12. The end device of claim 11, wherein the processor further executes the instructions to:
    store the second data, wherein the multiple instances of the first data indicate different types of FEC coding schemes, and multiple instances of the second data indicate the channel condition values that correlate to the multiple instances of the first data, and wherein when selecting, the processor further executes the instructions to:

in response to the identification of the one of channel condition values, select one of the different types of FEC coding schemes of the first data that correlates to the one of the channel condition values of the second data.

13. The end device of claim 11, wherein when measuring, the processor further executes the instructions to:
measure a signal-to-noise ratio of the channel.

14. The end device of claim 9, wherein the
one of the one or multiple instances of the first data further indicates a coding rate.

15. The end device of claim 9, wherein when selecting, the processor further executes the instructions to:
select the one of the one or multiple instances of the first data based on an establishment cause associated with the radio resource control connection request.

16. A non-transitory, computer-readable storage medium storing instructions executable by a processor of a computational device, which when executed cause the computational device to:
store one or multiple instances of first data that indicate one or multiple types of forward error correction (FEC) coding schemes supported by the computational device;
generate a radio resource control connection request;
select one of the one or multiple instances of the first data during the generation of the radio resource control connection request;
include the one of the one or multiple instances of the first data in the radio resource control connection request wherein the instructions to include comprise instructions to:
generate an information element that includes the one of the one or multiple instances of the first data; and
include the information element in the radio resource control connection request; and
transmit the radio resource control connection request to a wireless station of a wireless network.

17. The non-transitory, computer-readable storage medium of claim 16, further storing instructions to:
measure a condition of a channel;
store a channel condition value based on the measurement, and wherein the instructions to select further comprise instructions to:
compare the stored channel condition value to channel condition values included in a second data; and
identify one of the channel condition values that matches the stored channel condition value.

18. The non-transitory, computer-readable storage medium of claim 17, further storing instructions to:
store the second data, wherein the first data indicates different types of FEC coding schemes, and the second data indicates channel condition values that correlate to the different types of FEC coding schemes of the first data, and wherein the instructions to select, further comprise instructions to:
in response to the identification of the one of channel condition values, select one of the different types of FEC coding schemes of the first data that correlates to the one of the channel condition values of the second data.

19. The non-transitory, computer-readable storage medium of claim 17, wherein the instructions to measure further comprise instructions to:
measure a signal-to-noise ratio of the channel.

20. The non-transitory, computer-readable storage medium of claim 16, wherein the one or multiple types of FEC coding schemes includes one or more of Turbo coding or Low Density Parity Check coding.

* * * * *